US012726974B2

(12) United States Patent
Lei et al.

(10) Patent No.: US 12,726,974 B2
(45) Date of Patent: Sep. 1, 2026

(54) CROSS-CARRIER DATA TRANSMISSION METHOD, TERMINAL, AND STORAGE MEDIUM

(71) Applicant: SPREADTRUM SEMICONDUCTOR (NANJING) CO., LTD., Nanjing (CN)

(72) Inventors: Zhenzhu Lei, Nanjing (CN); Sicong Zhao, Nanjing (CN); Huayu Zhou, Nanjing (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 560 days.

(21) Appl. No.: 18/258,655

(22) PCT Filed: Nov. 26, 2021

(86) PCT No.: PCT/CN2021/133738

§ 371 (c)(1),
(2) Date: Jun. 21, 2023

(87) PCT Pub. No.: WO2022/135051

PCT Pub. Date: Jun. 30, 2022

(65) Prior Publication Data

US 2024/0049219 A1 Feb. 8, 2024

(30) Foreign Application Priority Data

Dec. 25, 2020 (CN) ......................... 202011573695.4

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0096* (2013.01); *H04W 72/044* (2013.01); *H04W 72/232* (2023.01); *H04W 84/06* (2013.01)

(58) Field of Classification Search
None
See application file for complete search history.

(56) References Cited

U.S. PATENT DOCUMENTS

2015/0271730 A1 9/2015 Benammar et al.
2019/0349065 A1* 11/2019 Zhang .................. H04W 36/06
(Continued)

FOREIGN PATENT DOCUMENTS

CN 109257075 A 1/2019
CN 109474400 A 3/2019
(Continued)

OTHER PUBLICATIONS

WIPO, International Search Report and Written Opinion for International Application No. PCT/CN2021/133738, Feb. 16, 2022.
(Continued)

*Primary Examiner* — Steve R Young
(74) *Attorney, Agent, or Firm* — K&L Gates LLP

(57) ABSTRACT

A cross-carrier data transmission method, a terminal, and a storage medium are provided, applied to a non-terrestrial network communication system including the terminal and a network device. The method includes the following. The network device sends first downlink control information (DCI) to the terminal, where the first DCI carries first information. The terminal obtains the first DCI and determines, according to the first information in the first DCI, whether to switch data scheduled by the first DCI from a current carrier to a target carrier for transmission, where the current carrier is a carrier for transmitting the first DCI.

17 Claims, 8 Drawing Sheets

(51) Int. Cl.

| | |
|---|---|
| ***H04W 72/044*** | (2023.01) |
| ***H04W 72/232*** | (2023.01) |
| *H04W 84/06* | (2009.01) |

(56) References Cited

U.S. PATENT DOCUMENTS

| | | | | |
|---|---|---|---|---|
| 2020/0351927 | A1* | 11/2020 | Davydov | H04W 72/1273 |
| 2021/0259004 | A1* | 8/2021 | Takeda | H04L 1/08 |
| 2022/0167352 | A1* | 5/2022 | Bhamri | H04L 5/0053 |
| 2022/0304035 | A1* | 9/2022 | Zhang | H04W 72/23 |
| 2022/0353853 | A1* | 11/2022 | Wu | H04L 1/1854 |
| 2023/0275738 | A1* | 8/2023 | Tang | H04L 5/0092 370/330 |
| 2024/0049234 | A1* | 2/2024 | Yoshimura | H04L 5/0053 |

FOREIGN PATENT DOCUMENTS

| | | | |
|---|---|---|---|
| CN | 109698739 | A | 4/2019 |
| CN | 109996338 | A | 7/2019 |
| CN | 110120860 | A | 8/2019 |
| CN | 110351058 | A | 10/2019 |
| CN | 111132250 | A | 5/2020 |
| CN | 111817835 | A | 10/2020 |
| CN | 111818604 | A | 10/2020 |
| WO | 2019210512 | A1 | 11/2019 |
| WO | 2020220871 | A1 | 11/2020 |

OTHER PUBLICATIONS

First Office Action issued in corresponding Chinese Application No. 202011573695.4 dated Mar. 14, 2024.

Second Office Action issued in corresponding Chinese Application No. 202011573695.4 dated Aug. 2, 2024.

Notification of grant of patent right for invention issued in corresponding Chinese Application No. 202011573695.4 dated Dec. 17, 2024.

* cited by examiner satellite motion direction

810

C2 C6 C7

C1 C3 C5 C8

C0 C4 C9

820

CROSS-CARRIER DATA TRANSMISSION METHOD, TERMINAL, AND STORAGE MEDIUM

CROSS-REFERENCE TO RELATED APPLICATION(S)

This application is a National Stage of International Application No. PCT/CN2021/133738, field on Nov. 26, 2021, which claims priority to Chinese Patent Application No. 202011573695.4, filed on Dec. 25, 2020, both of which are incorporated by reference herein.

TECHNICAL FIELD

This disclosure relates to the field of communication technology, in particular to a cross-carrier data transmission method, a terminal, and a storage medium.

BACKGROUND

At present, the 3rd generation partnership project (3GPP) is developing protocol standards for non-terrestrial network (NTN) communication. A satellite in a NTN communication system generally generate one or more beams (or called beam footprints) on the ground, and the one or more beams form a cell on the ground. A terminal in the cell can be in the coverage range of any of all beams of the cell.

However, because the satellite in NTN communication system is far away from the ground and the satellite will move continuously along the fixed orbit, the propagation distance (i.e., propagation delay) between the terminal and the satellite is often large, and the beam generated by the satellite on the ground will move on the ground with the motion of the satellite. In addition, because one transmission process of data scheduled by the network may last for a long time, the terminal may have beam switching in the transmission process of the data. For the beam switching occurred in the transmission process of the data scheduled by the network, how the network indicates the currently scheduled data to be transmitted across beams is a problem. In addition, for beam switching, in the future, beam switching may be achieved through carrier switching, that is, different beams correspond to different carriers. In other words, for the carrier switching occurred in the transmission process of the data scheduled by the network, how the network indicates the currently scheduled data to be transmitted across carriers becomes a problem to be solved at present.

SUMMARY

In a first aspect, implementations of the disclosure provide a cross-carrier data transmission method. The cross-carrier data transmission method is applied to a terminal in a non-terrestrial network communication system. The non-terrestrial network communication system includes the terminal and a network device. The method includes: obtaining first downlink control information (DCI) from the network device, where the first DCI carries first information; and determining, according to the first information, whether data scheduled by the first DCI is to be switched from a current carrier to a target carrier for transmission, where the current carrier is a carrier for transmitting the first DCI.

In a second aspect, implementations of the disclosure provide a terminal. The terminal is applied to a non-terrestrial network communication system and includes a memory and a processor. The memory is for storing one or more programs. The processor is coupled with the memory and configured to invoke the one or more programs to: obtain first DCI from a network device in the non-terrestrial network communication system, where the first DCI carries first information; and determine, according to the first information, whether data scheduled by the first DCI is to be switched from a current carrier to a target carrier for transmission, where the current carrier is a carrier for transmitting the first DCI.

In a third aspect, implementations of the disclosure provide a non-transitory computer-readable storage medium. The computer-readable storage medium is configured to store a computer program. When executed by a terminal in a non-terrestrial network communication system, the computer program causes the terminal to: obtain first DCI from a network device in the non-terrestrial network communication system, where the first DCI carries first information; and determine, according to the first information, whether data scheduled by the first DCI is to be switched from a current carrier to a target carrier for transmission, where the current carrier is a carrier for transmitting the first DCI.

BRIEF DESCRIPTION OF THE DRAWINGS

To more clearly explain technical solutions in implementations of the disclosure, a brief introduction will be given below to the drawings to be used in the description of the implementations or the related art. Apparently, the drawings described below are merely some implementations of the disclosure, and other drawings may be obtained from these drawings without creative effort for those of ordinary skill in the art.

DETAILED DESCRIPTION

The technical solutions of implementations of the disclosure will be described below in conjunction with the drawings in the implementations of the disclosure. Apparently, the described implementations are part of the implementations of the disclosure, rather than all the implementations. With respect to the implementations in the disclosure, all other implementations obtained by those of ordinary skill in the art without creative efforts fall within the scope of protection of the disclosure.

The technical solutions of the implementations of the disclosure can be applied to a non-terrestrial network (NTN) communication system, and the NTN communication system generally provides communication services to a terrestrial terminal by means of satellite communication.

Figure 1:
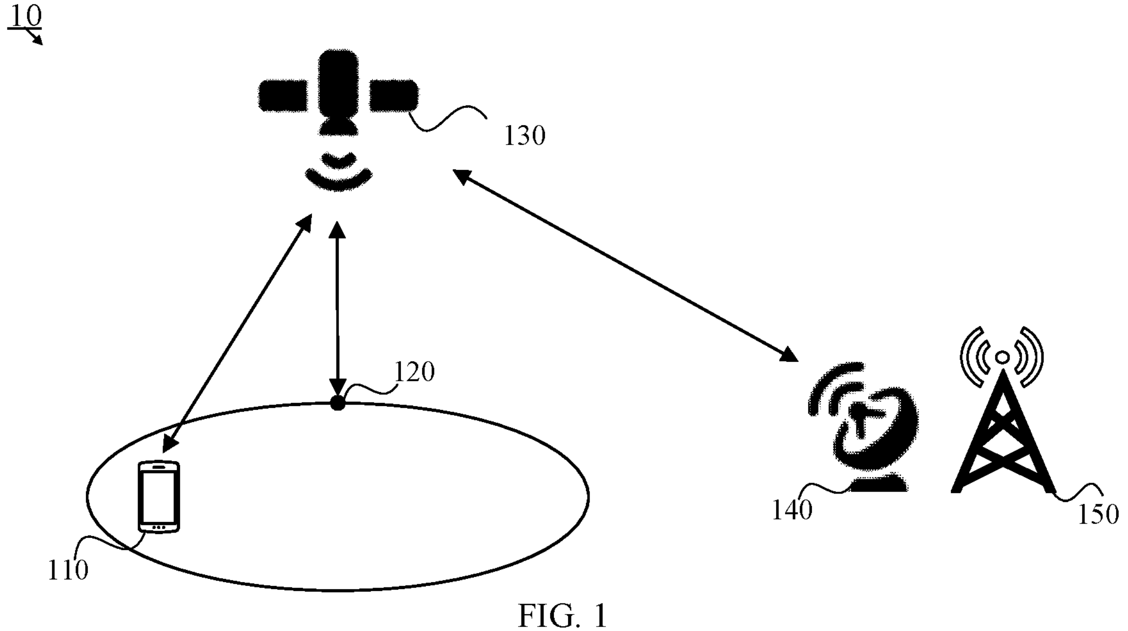
FIG. 1 is a schematic architectural diagram of a non-terrestrial network communication system provided in implementations of the disclosure.

For example, the non-terrestrial network communication system to which the implementations of the disclosure are applied is shown in FIG. 1. The non-terrestrial network communication system 10 may include a terminal 110, an intra-cell reference point 120, a satellite 130, a non-terrestrial network gateway (NTN gateway) 140, and a network device 150. The terminal 110, the non-terrestrial network gateway 140, and the network device 150 may be located on the earth surface while the satellite 130 is in earth orbit. The satellite 130 may provide communication services to a geographic area covered by the signal and may communicate with the terminal 110 located in the signal coverage area. Meanwhile, the terminal 110 is located in a cell and the cell includes the intra-cell reference point 120. Further, a wireless communication link between the terminal 110 and the satellite 130 is referred to as a service link, and a wireless communication link between the satellite 130 and the NTN gateway 140 is referred to as a feeder link. It should be noted that the NTN gateway 140 and the network device 150 may be integrated into the same device or may be separate different devices, which is not specifically limited.

Implementations of the disclosure are described in conjunction with the terminal, the satellite, and the network device. They are introduced in detail below.

Specifically, the terminal in the implementations of the disclosure may be a user equipment (UE), an access terminal, a user unit, a user station, a mobile radio station, a mobile station, a remote station, a remote terminal, a mobile device, a user terminal, a smart terminal, a wireless communication device, a user agent or a user device. The terminal may also be a cellular telephone, a cordless telephone, a session initiation protocol (SIP) telephone, a wireless local loop (WLL) station, a personal digital assistant (PDA), a handheld device or a computing device having a wireless communication function, or another processing device connected to a wireless modem, a relay device, a vehicle-mounted device, a wearable device, an internet of things device, a terminal in a next generation communication system such as an new radio (NR) network or a future evolved public land mobile network (PLMN), etc., which is not specifically limited.

Further, the terminal can be deployed on the land, including indoor or outdoor, hand-held, wearable or vehicle-mounted, can be deployed on the water (such as ship), or can also be deployed in the air (such as airplane, balloon, and satellite).

Further, the terminal may be a mobile phone, a tablet computer, a computer with a wireless transceiver function, a virtual reality (VR) terminal device, an augmented reality (AR) terminal device, a wireless terminal device in industrial control, a vehicle-mounted device in self driving, a wireless terminal device in remote medical, a wireless terminal device in smart grid, a wireless terminal device in transportation safety, a wireless terminal device in smart city, a wireless terminal device in smart home, and the like.

Specifically, the satellite in implementations of the disclosure may be a spacecraft carrying a bent pipe payload or regenerative payload signal transmitter, which typically operates in a low earth orbit (LEO) at an altitude of between 300 and 1500 km, a medium earth orbit (MEO) at an altitude of between 7000 and 25000 km, a geostationary earth orbit (GEO) at an altitude of 35786 km, or a high elliptical orbit (HEO) at an altitude of between 400 and 50000 km. That is, satellites can be LEO satellites, MEO satellites, GEO satellites, or HEO satellites according to different orbital altitudes.

Further, the signal transmitted by the satellite in implementations of the disclosure typically generates one or more beams (or called beam footprints) on a given service area bounded by its field of view. Meanwhile, the shape of the beam on the ground can be elliptical, and the field of view of the satellite depends on antenna and minimum elevation angle.

Specifically, the non-terrestrial network gateway in implementations of the disclosure may be an earth station or gateway located on the surface of the earth and capable of providing sufficient radio frequency (RF) power and RF sensitivity to connect to the satellite. Meanwhile, the non-terrestrial network gateway can be a transport network layer (TNL) node.

Specifically, the network device in the implementations of the disclosure may be a base station (BTS) in a global system of mobile communication (GSM) communication system or a code division multiple access (CDMA) communication system, a base station (NB) in a wideband code division multiple access (WCDMA) communication system, an evolved node B (eNB or eNodeB) in a long term evolution (LTE) communication system, or a base station (gNB) in a NR communication system. The network device may also be an access point (AP) in a wireless local area network (WLAN), a relay station, a network device in a future evolved PLMN network, or a network device in an NTN communication system, etc.

It should be noted that, in some network deployments, gNB can include a centralized unit (CU) and a distributed unit (DU), and gNB can also include an active antenna unit (AAU). The CU can realize some functions of gNB, and the DU can realize some other functions of gNB. For example, the CU is responsible for processing non-real-time protocols and services, and realizing functions of radio resource control (RRC) layer and packet data convergence protocol (PDCP) layer. The DU is responsible for dealing with physical layer protocols and real-time services, and realizing functions of radio link control (RLC) layer, medium access control (MAC) layer, and physical (PHY) layer. In addition, the AAU realizes some physical layer processing functions, RF processing, and related functions of active antenna. Because the information of the RRC layer will eventually become the information of the PHY layer, or be transformed from the information of the PHY layer, the higher layer signaling (such as the RRC layer signaling) can be considered to be sent by the DU or by both the DU and the AAU. It will be understood that the network device may include one or more of the CU node, the DU node, and the AAU node. Further, the CU may be a network device in a radio access network (RAN) or a core network (CN), which is not specifically limited.

Figure 2:
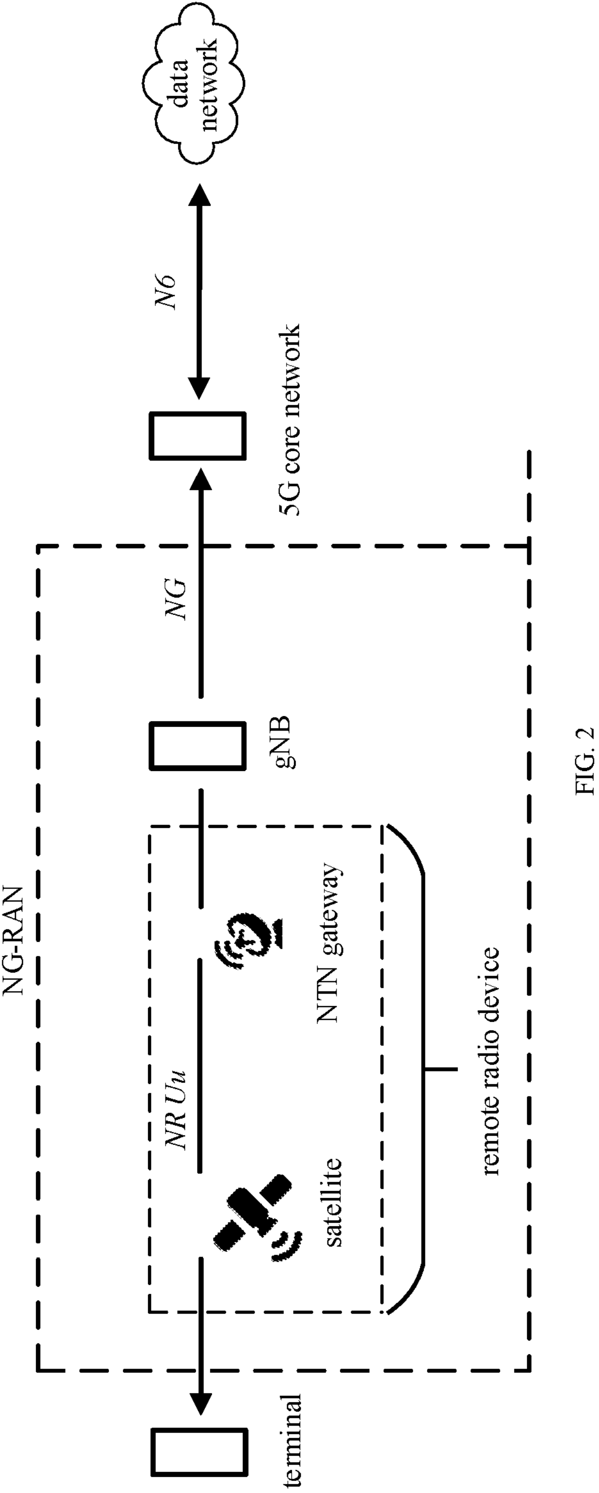
FIG. 2 is a schematic architectural diagram of a communication system having a transparent satellite provided in implementations of the disclosure.

Exemplarily, implementations of the disclosure provide a schematic architectural diagram of a communication system having a transparent satellite, as shown in FIG. 2. The terminal, the non-terrestrial network gateway, and the gNB are located on the surface of the earth, while the satellite is located in the earth orbit. Meanwhile, the satellite, the non-terrestrial network gateway, and the gNB can be used as 5G-radio access network (NG-RAN), and NG-RAN is connected to 5G core network through the NG interface. It should be noted that the satellite payload has realized frequency conversion and RF amplifier in both uplink and downlink directions, and the satellite corresponds to analog RF repeater. In addition, different transparent satellites can be connected to the same gNB on the ground.

Before the carrier switching method provided in the implementations of the disclosure is introduced in detail, the related communication technology related to the disclosure is introduced.

1. Multi-Carrier in Narrow Band Internet of Things (NB-IoT)

Because the NB-IoT single frequency cell only has the bandwidth of 180 kHz, and on this bandwidth, the remaining traffic channel capacity is very small except the overhead of narrow-band primary synchronization signal (NPSS), narrow-band secondary synchronization signal (NSSS), and system information block narrow-band (SIB-NB). Therefore, to support a large number of terminals, it is necessary to adopt multiple frequencies to improve the network capacity.

The NB-IoT supports multi-carrier configuration, and its carriers can be divided into two categories: anchor carrier and non-anchor carrier. Meanwhile, the same cell can include an anchor carrier and several non-anchor carriers, where the spectrum bandwidth of each carrier is 180 kHz, and the maximum spectrum span of all carriers in the cell does not exceed 20 MHz.

Anchor carrier. There is only one carrier in the multi-carrier cell that can simultaneously carry NPSS, NSSS, narrow-band physical broadcast channel (NPBCH), narrow-band physical downlink control channel (NPDCCH), and narrow-band physical downlink share channel (NPDSCH). This carrier is called anchor carrier. Therefore, the terminal can monitor NPSS, NSSS, NPBCH, NPDCCH, and NPDSCH information on the anchor carrier.

Non-anchored carrier. In the multi-carrier cell, there may be several carriers that only carry NPDCCH and NPDSCH but do not carry NPSS, NSSS, and NPBCH, which are called non-anchored carriers. Therefore, the terminal can send or receive data on the non-anchored carrier. In addition, before the terminal enters a connected state, the network specifies a carrier for subsequent downlink data transmission through the message (Msg4) in the random access process. When the terminal is in an idle state, the terminal can monitor paging on the non-anchored carrier.

2. NTN Communication System

In the NTN communication system, the satellite generally generates one or more beams (or called beam footprints) on the ground, and the shape of one beam on the ground can be elliptical. The beams generated by some satellites (such as LEO satellites) on the ground will also move on the ground with the motion of the satellite in its orbit. Alternatively, the beams or cells generated by some satellites (such as LEO satellites or GEO satellites) on the ground will not move on the ground as the satellite moves in its orbit.

Figure 3:
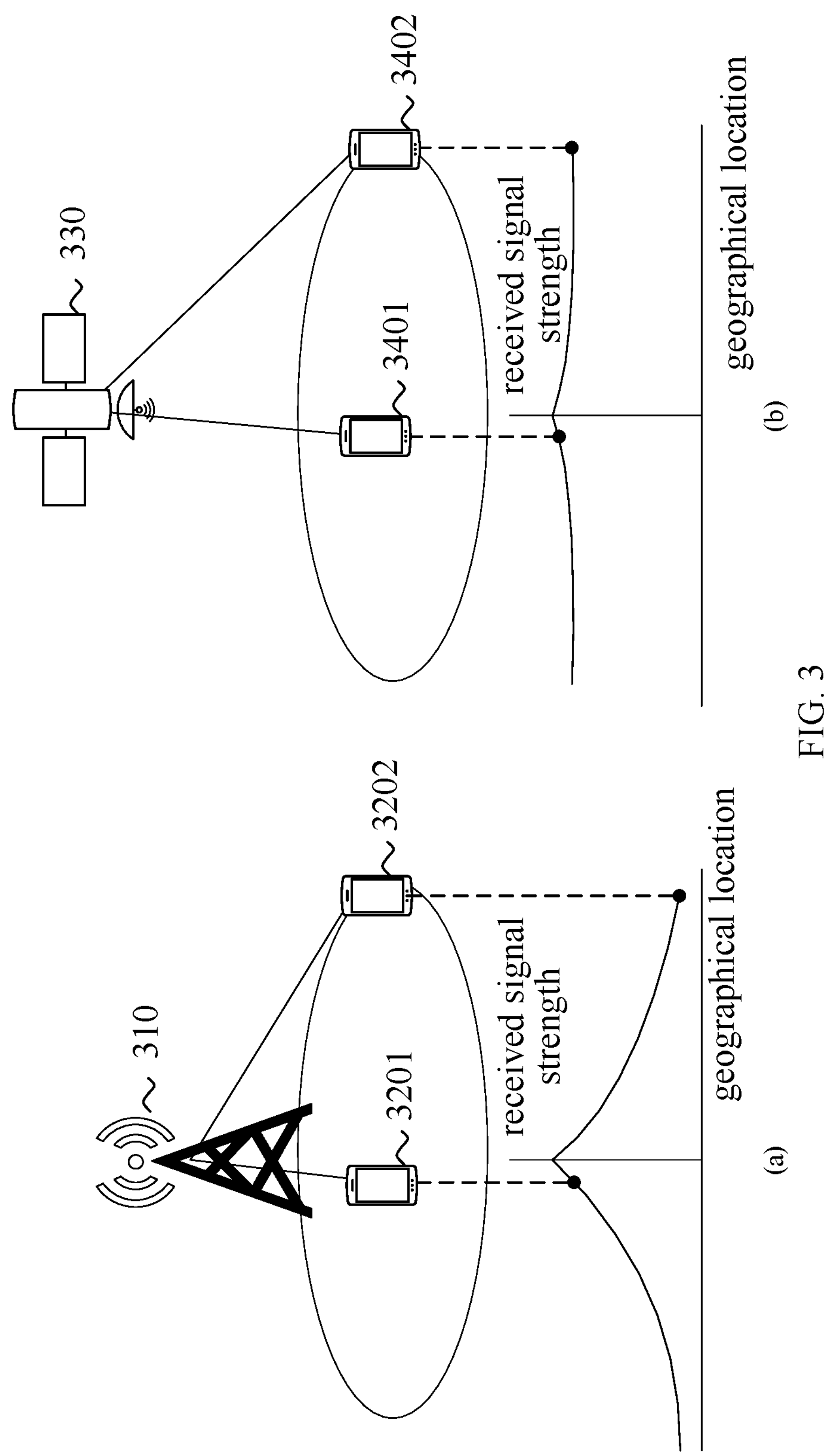
FIG. 3 is a schematic structural diagram of comparison of signal received qualities of a terrestrial network communication system and a non-terrestrial network communication system provided in implementations of the disclosure.

Because the distance between the satellite and the ground is very long (for example, GEO satellite is 35786 km), in the coverage area of the same beam or cell, the difference in propagation distances between terminals (such as UE) at different geographical locations and the satellite is small (that is, the difference in road loss of signals corresponding to the terminals at different geographical locations in the coverage area of the same cell is small), which leads to very small difference in signal received qualities (including downlink received qualities of terminals or uplink received qualities of base stations) corresponding to the terminals at different geographical locations in the coverage area of the same beam/cell, as shown in FIG. 3.

In the terrestrial network communication system shown in (a) of FIG. 3, there are a terminal 3201 and a terminal 3202 at different geographic locations in the coverage area of the same cell. Since there is a large difference between a propagation distance from the network device 310 to the terminal 3201 and a propagation distance from the network device 310 to the terminal 3202, there is a large difference between a signal received quality corresponding to the terminal 3201 and a signal received quality corresponding to the terminal 3202. In the NTN communication system shown in (b) of FIG. 3, there are a terminal 3401 and a terminal 3402 at different geographical locations in the coverage range of the same beam/cell. Since the distance from the satellite 330 to the ground is very far, there is a small difference between a propagation distance from the satellite 330 to the terminal 3401 and a propagation distance from the satellite 330 to the terminal 3402, resulting in a small difference between a signal received quality corresponding to the terminal 3401 and a signal received quality corresponding to the terminal 3402.

3. Architecture of NTN Communication System

Figure 4:
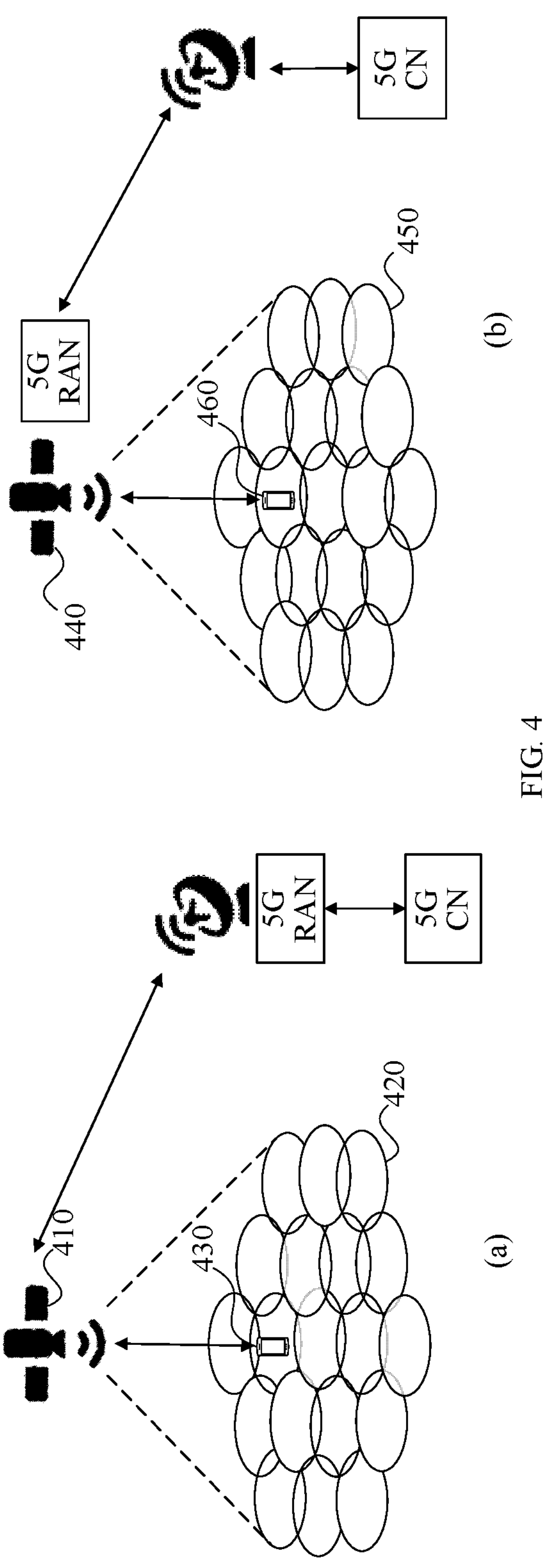
FIG. 4 is a schematic architectural diagram of comparison of architectures of a non-terrestrial network communication system provided in implementations of the disclosure.

The architecture of the NTN communication system in the implementations of the disclosure mainly includes an NTN communication architecture having a transparent satellite (or called bent pipe payload) (i.e., transparent forwarding mode) and an NTN communication architecture having a regenerative satellite (i.e., regenerative signal mode), referring to FIG. 4. The NTN communication architecture having the transparent satellite is illustrated in (a) of FIG. 4, and the NTN communication architecture having the regenerative satellite is illustrated in (b) of FIG. 4. In (a) of FIG. 4, the satellite 410 in the transparent forwarding mode generates at least one beam 420 on the ground and the at least one beam 420 may form one cell on the ground. Meanwhile, the terminal 430 located in the cell can measure one of all beams of the cell and establish a communication connection with the satellite 410 through the beam. Similarly, in (b) of FIG. 4, the satellite 440 in the regenerative signal mode generates at least one beam 450 on the ground and the at least one beam 450 may form one cell on the ground. Meanwhile, the terminal 460 located in the cell can measure one of all beams of the cell and establish a communication connection with the satellite 440 through the beam.

4. Transmission Repetition of Data

To ensure the communication coverage, the existing narrow band internet of things (NB-IoT) or enhanced machine-type communication (eMTC) adopts the technology of transmission repetition. The maximum number of transmission repetitions for downlink transmission is 2048, while the maximum number of transmission repetitions for uplink transmission is 128. In addition, the number of transmission repetitions of a physical downlink share channel (PDSCH)

or a physical uplink share channel (PUSCH) can be dynamically indicated by downlink control information (DCI) scheduled by the PDSCH or PUSCH, i.e., the DCI has a specific bit field for indicating the number of transmission repetitions of the PDSCH or PUSCH. Meanwhile, the maximum number of repetitions (i.e., Rmax) of physical downlink control channel (PDCCH) can be semi-statically configured by RRC signaling or system information block (SIB).

In the terrestrial network communication system (as shown in FIG. 3), because the propagation distances between the terminals at different geographical locations in the coverage area of the same cell and the base station are quite different, when the terminals receive or send data, the terminals located at different geographical locations (such as cell center or cell edge) require different numbers of transmission repetitions of data (i.e., numbers of transmission repetitions of PDSCH/PUSCH/PRACH/PDCCH). At present, for the number of transmission repetitions in terrestrial network communication, the network can dynamically indicate the number of transmission repetitions of PDSCH/PUSCH by a specific bit field in DCI scheduled by the PDSCH/PUSCH.

Combined with the above description, the implementations of the disclosure provide a schematic flow chart of a cross-carrier data transmission method. The method is applied to a non-terrestrial network communication system, referring to FIG. 5. The method includes the following.

S510, a network device sends first DCI to a terminal, where the first DCI carries first information.

The first information is used for determining whether data scheduled by the first DCI is to be switched from a current carrier to a target carrier for transmission, and the current carrier is a carrier for transmitting the first DCI.

It should be noted that, the technical solutions in the implementations of the disclosure is applicable to both the transparent forwarding mode and the regenerative signal mode. In the transparent forwarding mode, the first DCI is sent by the network device located on the ground. In the regenerative signal mode, since the network device is located on the satellite, the first DCI is sent by the network device located on the satellite. In addition, the "first DCI" in the implementations of the disclosure is mainly used to describe the DCI sent by the network device at a certain time, and the indication field and indication information carried by the DCI sent at different times may have different control purposes, which is not specifically limited.

It should be further explained that, firstly, since the satellite in the NTN communication system generally generates one or more beams on the ground to form a cell and the terminal located in the cell can be in the coverage area of any one of all beams in the cell, as the satellite continuously moves along a fixed orbit, the beams generated by the satellite on the ground will also move on the ground along with the motion of the satellite. To ensure that the communication connection between the terminal and the satellite is not interrupted, the terminal may need to switch beams frequently. The beam switching can be managed by carrier switching, that is, each beam in all beams in the cell corresponds to one or more carriers (that is, one carrier corresponds to one beam), and beam switching is realized by carrier switching.

Secondly, because the distance between the satellite and the ground is very long, even if the terminal moves constantly (that is, the location of the terminal changes constantly) in a period of time, the propagation distance between the terminal and the satellite changes little. That is, the motion change of the terminal is small relative to the motion change of the satellite. Based on this, in the implementations of the disclosure, the current location of the terminal is approximately fixed for a period of time, and the beam switching caused by the continuous motion of the satellite is mainly analyzed.

Finally, in the NTN communication system scenario in the implementations of the disclosure, because one data transmission process scheduled by the network may last for a long time, the terminal may frequently perform beam (i.e., carrier) switching in said data transmission process. For the carrier switching occurred in the transmission process of the data scheduled by the DCI, the disclosure can provide the following two manners. One manner is to ensure that the scheduled data can finish transmission on the current carrier (the carrier transmitting the DCI) when the network schedules data through the DCI (i.e., scheduling the DCI), and this manner will have serious restrictions on network scheduling. Another manner is to support cross-carrier data transmission (i.e., cross-carrier scheduling), but to support cross-carrier data transmission, the NTN communication system needs to design a new indication field or indication information for the DCI to indicate whether to perform cross-carrier data transmission.

In combination with the above description, in the implementations of the disclosure, in the transmission process of the data scheduled by the first DCI, the cross-carrier data transmission in the transmission process of the data scheduled by the first DCI is achieved by carrying the first information in the first DCI, which is not only beneficial to alleviating the restriction on the network data scheduling caused by frequent carrier switching (i.e., beam switching) in the NTN communication system, but also beneficial to improving the throughput of the NTN communication system. The following is described in detail.

Specifically, the first DCI may be a scheduling DCI, which refers to DCI carrying data scheduling information, such as DCI for scheduling PDSCH or PUSCH. Therefore, the data scheduled by the first DCI can be uplink data or downlink data. In addition, the first DCI may also schedule a single or multiple transport blocks (TB), which is not specifically limited.

Specifically, the current carrier and the target carrier correspond to different beams. The beam is a beam among all the beams in the serving cell where the terminal is located.

It should be noted that, based on the above, the satellite in the NTN communication system will generate one or more beams on the ground to form the cell, and the terminal located in the cell can be in the coverage range of any one of all beams in the cell. In this case, the cell is called the serving cell where the terminal is located (or camped).

In the following, different information contained in the first information will be described in detail in implementations of the disclosure.

Case 1

In one possible example, the first information may include first indication information, second indication information, and third indication information.

Specifically, the first indication information may be indicative of an index of the target carrier.

It should be noted that the terminal can determine the target carrier by the index of the target carrier indicated by the first indication information in the first DCI, so that the network can configure or indicate to the terminal the target carrier to-be-switched in the transmission process of the data scheduled by the first DCI. In addition, the first indication information can be an indication field carried by the first DCI, and the indication field can be a newly added or specific indication field in the DCI specified by the existing standard.

Specifically, the second indication information may be indicative of a total number M of transmission repetitions of the data scheduled by the first DCI, where M is an integer greater than 1.

It can be understood that the terminal can obtain the total number of transmission repetitions of the data scheduled by the first DCI through the second indication information in the first DCI.

The total number of transmission repetitions may be 32, 64, 128, 256, 512, 1024, 2048, and so on, which is not specifically limited. In addition, the second indication information may be an indication field carried by the first DCI, and the indication field may be a specific indication field in the DCI specified by the existing standard.

Specifically, the third indication information can be indicative of a first value index of a ratio of the number of transmissions on the current carrier to the total number of transmission repetitions, where the first value index is used for determining a first value in the ratio-coefficient value set information.

It should be noted that the ratio of the number of transmissions on the current carrier to the total number of transmission repetitions can be understood as: in the total number of transmission repetitions indicated by the second indication information in the first DCI, a ratio coefficient of the number of transmission repetitions on the current carrier to the total number of transmission repetitions.

For example, if the total number of transmission repetitions of the data scheduled by the first DCI is 64, and first 32 transmission repetitions of the data are on the current carrier and last 32 transmission repetitions of the data are on the target carrier, the ratio coefficient of the number of transmission repetitions on the current carrier to the total number of transmission repetitions is ½.

Further, the first value index indicated by the third indication information can be understood as a value index, and the value index can determine (query, index, or obtain) a value (i.e., the first value) from the ratio-coefficient value set information, and the first value is indicative of the ratio coefficient of the number of transmission repetitions that need to be transmitted over the current carrier to the total number of transmission repetitions indicated by the second indication information.

For example, if the ratio-coefficient value set information is {¼, ½, ¾, 1}, and the ratio coefficient ½ (i.e., the first value) is determined from the ratio-coefficient value set information through the first value index indicated by the third indication information in the first DCI, then, among the total number of transmission repetitions of the data scheduled by the first DCI, the first half is transmitted on the current carrier and the last half is transmitted on the target carrier.

The third indication information can be an indication field carried by the first DCI, and the indication field can be a newly added or specific indication field in the DCI specified by the existing standard.

Further, the length of the third indication information may be X bits. X is determined by the number of values in the ratio-coefficient value set information.

It should be noted that the length of the third indication information in the first DCI obtained by the terminal may be X bits. Therefore, the third indication information may be referred to as X-bit information. In this case, the X-bit information can be indicative of the first value index by the bit coding mode of X bits. The bit coding mode of the X bits includes any coding combination of the X bits.

For example, if the ratio-coefficient value set information is {¼, ½, ¾, 1} and X is 2, bit coding mode of 2 bits includes “00”, “01”, “10”, and “11”. In this case, “00” is indicative of an index of a first value (i.e., ¼) in the ratio-coefficient value set information, “01” is indicative of an index of a second value (i.e., ½) in the ratio-coefficient value set information, “10” is indicative of an index of a third value (i.e., ¾) in the ratio-coefficient value set information, and “11” is indicative of an index of a fourth value (i.e., 1) in the ratio-coefficient value set information.

It should be further explained that, X is determined by the number of values in the ratio-coefficient value set information. It can be understood that the network device can configure X by the number of values in the ratio-coefficient value set information, thereby establishing a mapping relationship between the number of values in the ratio-coefficient value set information and X, avoiding excessive overhead of the first DCI. Meanwhile, there may be a reserved bit(s) in the X-bit information.

For example, if the ratio-coefficient value set information is {¼, ½, ¾, 1}, the number of values in the ratio-coefficient value set information is 4, so that X can be 2. If the ratio-coefficient value set information is {⅕, ⅖, ⅗, ⅘, 1}, the number of values in the ratio-coefficient value set information is 5, so that X can be 3. In this case, there may be reserved bits in the 3-bit information.

Further, the third indication information may be configured by the network device through RRC dedicated signaling.

It is understood that the length of the third indication information, i.e., X bits, and the bit coding mode of the X bits can be configured by RRC dedicated signaling.

Further, the ratio-coefficient value set information is indicated by the network device through system broadcast information or RRC dedicated signaling. Alternatively, the ratio-coefficient value set information is pre-configured.

The system broadcast information can be SIB.

It can be understood that, before the network device sends the first DCI carrying the first information to the terminal, the network device can indicate or configure the ratio-coefficient value set information to the terminal through the system broadcast information or RRC dedicated signaling. Alternatively, the ratio-coefficient value set information is pre-configured in the terminal.

In conclusion, determining, according to the first information, whether the data scheduled by the first DCI is to be switched from the current carrier to the target carrier for transmission may include: determining that first N transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, where N is determined by the first value and M.

It should be noted that N is determined by the first value and M, which can specifically include the following two manners.

Manner 1

$$N=(\text{the first value})*(M).$$

It should be noted that since the first value can be used to represent the ratio coefficient of the number of transmission repetitions that need to be transmitted on the current carrier in the total number of transmission repetitions indicated by the second indication information to the total number of transmission repetitions, the number (i.e., N) of transmission repetitions that need to be transmitted on the current carrier can be obtained by calculating the product of the ratio coefficient (i.e., the first value) and the total number (i.e., M) of transmission repetitions.

For example, firstly, the ratio-coefficient value set information is {¼, ½, ¾, 1}, and the total number of transmission repetitions of the data scheduled by the first DCI is 64. Then, the ratio coefficient ¼ (i.e., the first value) is determined from the ratio-coefficient value set information through the first value index indicated by the third indication information in the first DCI. Finally, by calculating the product of the ratio coefficient ¼ and the total number of transmission repetitions, the number of transmission repetitions that need to be transmitted on the current carrier is obtained, i.e., 16. In this case, first 16 transmission repetitions of the data scheduled by the first DCI are transmitted on the current carrier and last (remaining) 48 repetitions of the data are transmitted on the target carrier.

Manner 2

$$N=(M)-(\text{the first value})*(M).$$

It should be noted that, based on the above description, in the implementations of the disclosure, a product of the first value and the total number (i.e., M) of transmission repetitions is calculated to obtain a product value, and then a difference between the total number of transmission repetitions and the product value is calculated to obtain the number (i.e., N) of transmission repetitions that need to be transmitted on the current carrier.

For example, firstly, the ratio-coefficient value set information is {¼, ½, ¾, 1}, and the total number of transmission repetitions of the data scheduled by the first DCI is 64. Then, the ratio coefficient ¼ (i.e., the first value) is determined from the ratio-coefficient value set information through the first value index indicated by the third indication information in the first DCI. Finally, the product value 16 is obtained by calculating the product of the ratio coefficient ¼ and the total number of transmission repetitions, and a difference between the total number of transmission repetitions and the product value is calculated to obtain the number of transmission repetitions that need to be transmitted on the current carrier, i.e., 48. In this case, first 48 repetitions of the data scheduled by the first DCI are transmitted on the current carrier and last 16 repetitions of the data are transmitted on the target carrier.

Further, in combination with the above description of the X-bit information for indicating the first value index through the bit coding mode of the X bits, the implementations of the disclosure will give an example description of how to determine whether to switch according to the first information the data scheduled by the first DCI from the current carrier to the target carrier for transmission in “case 1”.

For example, firstly, the network device configures to the terminal the ratio-coefficient value set information of {¼, ½, ¾, 1} through SIB or RRC dedicated signaling.

Secondly, the network device sends the first DCI carrying the first information to the terminal. The first information includes the first indication information, the second indication information, and the third indication information. Meanwhile, the network device configures for the terminal, in the first DCI through the RRC dedicated signaling, the third indication information with the length of 2 bits (i.e., 2-bit information) and the bit coding mode of the 2 bits.

Thirdly, the terminal obtains the index of the target carrier through the first indication information, and determines the target carrier according to the index of the target carrier. The terminal obtains that the total number of transmission repetitions of the data scheduled by the first DCI is 64 through the second indication information. The terminal obtains the first value index through the bit coding mode of the 2 bits in the third indication information. If the bit coding mode of the 2 bits is “00”, the third indication information is indicative of an index of a first value (i.e., ¼) in the ratio-coefficient value set information. If the bit coding mode of the 2 bits is “01”, the third indication information is indicative of an index of a second value (i.e., ½) in the ratio-coefficient value set information. If the bit coding mode of the 2 bits is “10”, the third indication information is indicative of an index of a third value (i.e., ¾) in the ratio-coefficient value set information. If the bit coding mode of the 2 bits is “11”, the third indication information is indicative of an index of a fourth value (i.e., 1) in the ratio-coefficient value set information.

Figure 6:
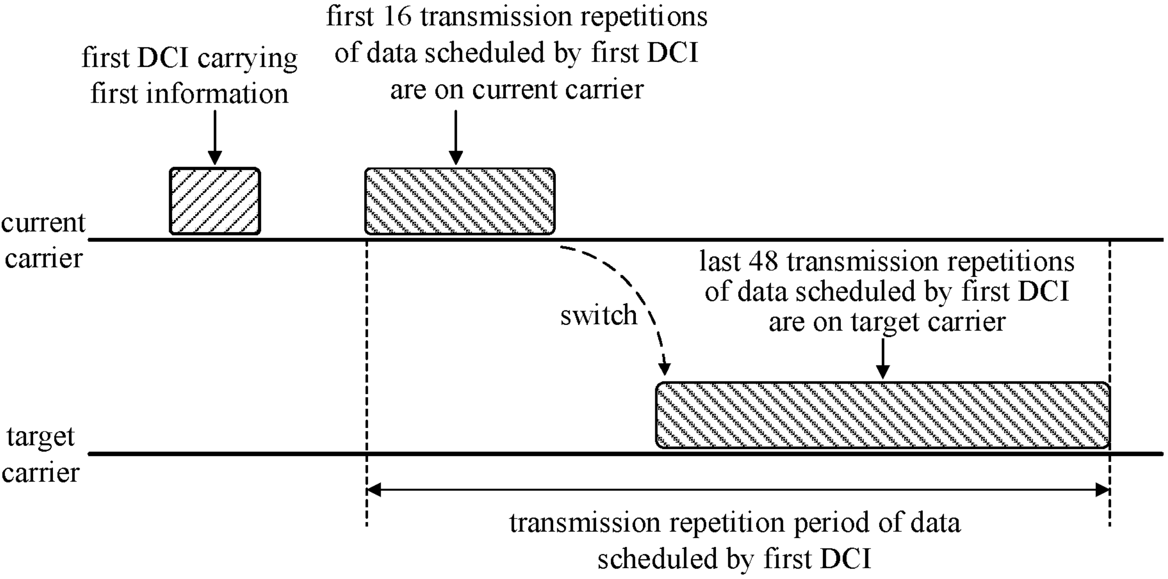
FIG. 6 is a schematic structural diagram of cross-carrier data transmission in a transmission repetition period of data scheduled by a first DCI provided in implementations of the disclosure.

Finally, when the first value index is the index of the first value (i.e., ¼) in the ratio-coefficient value set information, the terminal determines the ratio coefficient ¼ (i.e., the first value) through the first value index. In this case, the terminal knows that first 16 transmission repetitions of the data scheduled by the first DCI need to be on the current carrier, and last (remaining) 48 transmission repetitions of the data need to be on the target carrier, as specifically shown in FIG. 6. Alternatively, the terminal knows that the first 48 transmission repetitions of the data scheduled by the first DCI are on the current carrier and the last 16 transmission repetitions of the data are on the target carrier.

As can be seen, in “case 1”, the cross-carrier data transmission in the transmission process of the data scheduled by the first DCI is realized through the first information in the first DCI, which is not only beneficial to alleviating the restriction on network data scheduling caused by frequent carrier switching (i.e., beam switching) in the NTN communication system, but also beneficial to improving the throughput of the NTN communication system.

Case 2

In one possible example, the first information may include the first indication information, fourth indication information, and fifth indication information.

Specifically, the fourth indication information can be indicative of the total number S of transport blocks contained in the data scheduled by the first DCI, where S is an integer greater than 1.

It can be understood that the network schedules multiple transport blocks (TB) through the first DCI, where the number of the multiple transport blocks is S.

The total number of transport blocks can be 2, 4, 8, and so on, which is not specifically limited. In addition, the fourth indication information may be an indication field carried by the first DCI, and the indication field may be a specific indication field in the DCI specified by the existing standard.

Specifically, the fifth indication information can be indicative of a second value index of the number of transport blocks transmitted on the current carrier in the total number of transport blocks, where the second value index can be used for determining a second value in transport-block number value set information.

It should be noted that the number of transport blocks transmitted on the current carrier in the total number of transport blocks can be understood as: in the total number of transport blocks indicated by the fourth indication information in the first DCI, the number of transport blocks that can be transmitted on the current carrier in the total number of transport blocks.

For example, if the total number of transport blocks of the data scheduled by the first DCI is 4, i.e., the first DCI schedules 4 transport blocks, first 2 transport blocks of the 4 transport blocks are transmitted on the current carrier, and last 2 transport blocks of the 4 transport blocks are transmitted on the target carrier.

Further, the second value index indicated by the fifth indication information can be understood as a value index, and the value index can determine (query, index, or obtain) a value (i.e., the second value) from the transport-block number value set information, and the second value is indicative of the number of transport blocks that need to be transmitted on the current carrier in the total number of transport blocks indicated by the fourth indication information.

For example, if four transport blocks are scheduled in the first DCI and the transport-block number value set information is {1, 2, 4, 8}, the value 2 (i.e., the second value) is determined from the transport-block number value set information through the second value index indicated by the fifth indication information in the first DCI, so that the first two transport blocks of the four transport blocks are transmitted (i.e., sent or received) on the current carrier and the last two transport blocks of the four transport blocks are transmitted (i.e., sent or received) on the target carrier.

The fifth indication information can be an indication field carried by the first DCI, and the indication field can be a newly added or specific indication field in the DCI specified by the existing standard.

Further, the length of the fifth indication information is Y bits. Y is determined by the number of values in the transport-block number value set information.

It should be noted that the length of the fifth indication information in the first DCI obtained by the terminal may be Y bits. Therefore, the fifth indication information may be referred to as Y-bit information. In this case, the Y-bit information can be indicative of the second value index by the bit coding mode of Y bits. The bit coding mode of the Y bits includes any coding combination of the Y bits.

For example, if the transport-block number value set information is {1, 2, 4, 8} and Y is 2, the bit coding mode of the 2 bits includes "00", "01", "10", and "11". In this case, "00" is indicative of an index of a first value (i.e., 1) in the transport-block number value set information, "01" is indicative of an index of a second value (i.e., 2) in the transport-block number value set information, "10" is indicative of an index of a third value (i.e., 4) in the transport-block number value set information, and "11" is indicative of an index of a fourth value (i.e., 8) in the transport-block number value set information.

It should be further explained that, Y is determined by the number of values in the transport-block number value set information. It can be understood that the network device can configure Y by the number of values in the transport-block number value set information, thereby establishing a mapping relationship between the number of values in the transport-block number value set information and Y, avoiding excessive overhead of the first DCI. Meanwhile, there may be reserved bits in the Y-bit information.

For example, if the transport-block number value set information is {1, 2, 4, 8}, the number of values in the transport-block number value set information is 4, so that Y can be 2. If the transport-block number value set information is {1, 2, 4, 8, 12}, the number of values in the transport-block number value set information is 5, so that Y can be 3. In this case, there may be reserved bits in the 3-bit information.

Further, the fifth indication information may be configured by the network device through RRC dedicated signaling.

It can be understood that the length of the fifth indication information, i.e., Y bits, and the bit coding mode of the Y bits can be configured by RRC dedicated signaling.

Further, the transport-block number value set information is indicated by the network device through the system broadcast information or RRC dedicated signaling. Alternatively, the transport-block number value set information is pre-configured.

The system broadcast information can be SIB.

It can be understood that, before the network device sends the first DCI carrying the first information to the terminal, the network device can indicate or configure the transport-block number value set information to the terminal through the system broadcast information or RRC dedicated signaling. Alternatively, the transport-block number value set information is pre-configured in the terminal.

In conclusion, determining, according to the first information, whether the data scheduled by the first DCI is to be switched from the current carrier to the target carrier for transmission may include: determining that first T transport blocks in the total number of transport blocks are transmitted on the current carrier and a remaining transport block(s) in the total number of transport blocks are transmitted on the target carrier, according to the second value determined by the fifth indication information and the total number of transport blocks indicated by the fourth indication information, where T is determined by the second value and S.

It should be noted that T is determined by the second value and S, which can specifically include the following two manners.

Manner 1

$$T=\text{the second value};$$

It should be noted that since the second value is indicative of the number of transport blocks that need to be transmitted on the current carrier in the total number of transport blocks indicated by the fourth indication information, the number of transport blocks (i.e., the second value) can be taken as the number of transport blocks (i.e., T) transmitted on the current carrier.

For example, firstly, the transport-block number value set information is {1, 2, 4, 8}, and the total number of transport blocks of the data scheduled by the first DCI is 4, that is, the first DCI schedules 4 transport blocks. Then, the value 2 (i.e., the second value) is determined from the transport-block number value set information through the second value index indicated by the fifth indication information in the first DCI. Finally, the value 2 is taken as the number of transport blocks transmitted on the current carrier. In this case, first two transport blocks of the four transport blocks scheduled by the first DCI are transmitted on the current carrier and remaining two transport blocks are transmitted on the target carrier.

Manner 2

$$T=(S)-(\text{the second value}).$$

It should be noted that, based on the above description, in the implementations of the disclosure, a difference between the total number (i.e., S) of transport blocks and the second value is calculated to obtain the number (i.e., T) of transport blocks that need to be transmitted on the current carrier.

For example, firstly, the transport-block number value set information is {1, 2, 4, 8}, and the total number of transport blocks of the data scheduled by the first DCI is 4. Then, the value 1 (i.e., the second value) is determined from the transport-block number value set information through the second value index indicated by the fifth indication information in the first DCI. Finally, a difference between the total number of transport blocks 4 and the value 1 is calculated to obtain the number of transport blocks that need to be transmitted on the current carrier, i.e., 3. In this case, first three transport blocks of the four transport blocks scheduled by the first DCI are transmitted on the current carrier and the remaining one transport block is transmitted on the target carrier.

Further, in combination with the above description of the Y-bit information for indicating the second value index through the bit coding mode of the Y bits, the implementations of the disclosure will give an example description of how to determine whether to switch according to the first information the data scheduled by the first DCI from the current carrier to the target carrier for transmission in "case 2".

For example, firstly, the network device configures to the terminal the transport-block number value set information {1, 2, 4, 8} through SIB or RRC dedicated signaling.

Secondly, the network device sends the first DCI carrying the first information to the terminal. The first information includes the first indication information, the fourth indication information, and the fifth indication information. Meanwhile, the network device configures, to the terminal in the first DCI through the RRC dedicated signaling, the fifth indication information with the length of 2 bits (i.e., 2-bit information) and the bit coding mode of the 2 bits.

Thirdly, the terminal obtains the index of the target carrier through the first indication information, and determines the target carrier according to the index of the target carrier. The terminal obtains that the total number of transport blocks contained in the data scheduled by the first DCI is 4 through the fourth indication information. The terminal obtains the second value index through the bit coding mode of the 2 bits in the fifth indication information. If the bit coding mode of the 2 bits is "00", the fifth indication information is indicative of an index of a first value (i.e., 1) in the transport-block number value set information. If the bit coding mode of the 2 bits is "01", the fifth indication information is indicative of an index of a second value (i.e., 2) in the transport-block number value set information. If the bit coding mode of the 2 bits is "10", the fifth indication information is indicative of an index of a third value (i.e., 4) in the transport-block number value set information. If the bit coding mode of the 2 bits is "11", the fifth indication information is indicative of an index of a fourth value (i.e., 8) in the transport-block number value set information.

Finally, when the second value index is the index of the first value (i.e., 1) in the transport-block number value set information, the terminal determines the value 1 (i.e., the second value) through the second value index. In this case, the terminal knows that first one of the four transport blocks scheduled by the first DCI is transmitted on the current carrier, and the remaining three transport blocks are transmitted on the target carrier, as specifically shown in FIG. 7. Alternatively, the terminal knows that the first three transport blocks of the four transport blocks scheduled by the first DCI are transmitted on the current carrier and the remaining one transport block is transmitted on the target carrier.

As can be seen, in "case 2", the cross-carrier data transmission in the transmission process of the data scheduled by the first DCI is realized through the first information in the first DCI, which is not only beneficial to alleviating the restriction on network data scheduling caused by frequent carrier switching (i.e., beam switching) in the NTN communication system, but also beneficial to improving the throughput of the NTN communication system.

S520, the terminal obtains the first DCI from the network device.

In conjunction with the above description, in the following, the implementations of the disclosure will specifically describe how the terminal determines the target carrier through the index of the target carrier indicated by the first indication information in the first DCI in the above "case 1" and "case 2".

Specifically, the index of the target carrier is in a carrier index set information.

The carrier index set information includes indexes of Q carriers and one candidate carrier index set associated with each of the indexes of the Q carriers, the indexes of the Q carriers include an index of the current carrier, and the index of the target carrier is specifically in a candidate carrier index set associated with the index of the current carrier. The index of each carrier in the carrier index set information corresponds to one beam, where Q is an integer greater than 1. The candidate carrier index set includes indexes of R carriers in the indexes of the Q carriers, and R is less than or equal to Q.

Further, the carrier index set information can be configured by the network device through the RRC dedicated signaling. Alternatively, the carrier index set information is pre-configured.

It should be noted that, in the implementations of the disclosure, the indexes of the Q carriers and one candidate carrier index set associated with each of the indexes of the Q carriers, i.e., the carrier index set information, are configured to the terminal. There is no arrangement order between the indexes of Q carriers and between carrier indexes in the candidate carrier index set. The network device may then transmit the first DCI to the terminal over a certain carrier (i.e., the current carrier). In addition, since the index of each carrier in the carrier index set information is associated with one candidate carrier index set and the index of the target carrier is specifically in the candidate carrier index set associated with the index of the current carrier, it is necessary to consider indexes of carriers in the candidate carrier index set associated with the index of the current carrier.

In the following, the implementations of the disclosure will describe in detail how the indexes of the Q carriers and the indexes of the R carriers in the candidate carrier index set are determined.

Specifically, the carrier index set information can satisfy at least one of the following manners: the indexes of the Q carriers in the carrier index set information are determined by a current location information of the terminal and a preset satellite ephemeris, and the indexes of the R carriers in the candidate carrier index set in the carrier index set information are determined by distribution of beams corresponding to the indexes of the Q carriers.

It should be noted that the terminal can calculate the current location information through its global navigation satellite system (GNSS), and then send it to the network device. Then, the network device can determine the indexes of the Q carriers in the carrier index set information according to the current location information of the terminal and the preset satellite ephemeris, to establish the mapping relationship between the current location of the terminal and the motion trajectory of the satellite and the carrier index in the carrier index set information.

In addition, there is beam distribution between one or more beams generated on the ground by the satellite in the NTN communication system, which is called beam ground distribution map. Thus, in implementations of the disclosure, the network device determines indexes of carriers in candidate carrier index sets associated with the indexes of the Q carriers according to distribution of beams corresponding to the indexes of the Q carriers.

Specifically, the indexes of the R carriers are determined by the distribution of beams corresponding to the indexes of the Q carriers, which can specifically include the following steps: determining respective adjacent beams of beams corresponding to the indexes of the Q carriers, and forming the indexes of the R carriers by carriers corresponding to the respective adjacent beams. The following is a specific example.

Figures 7, 8:
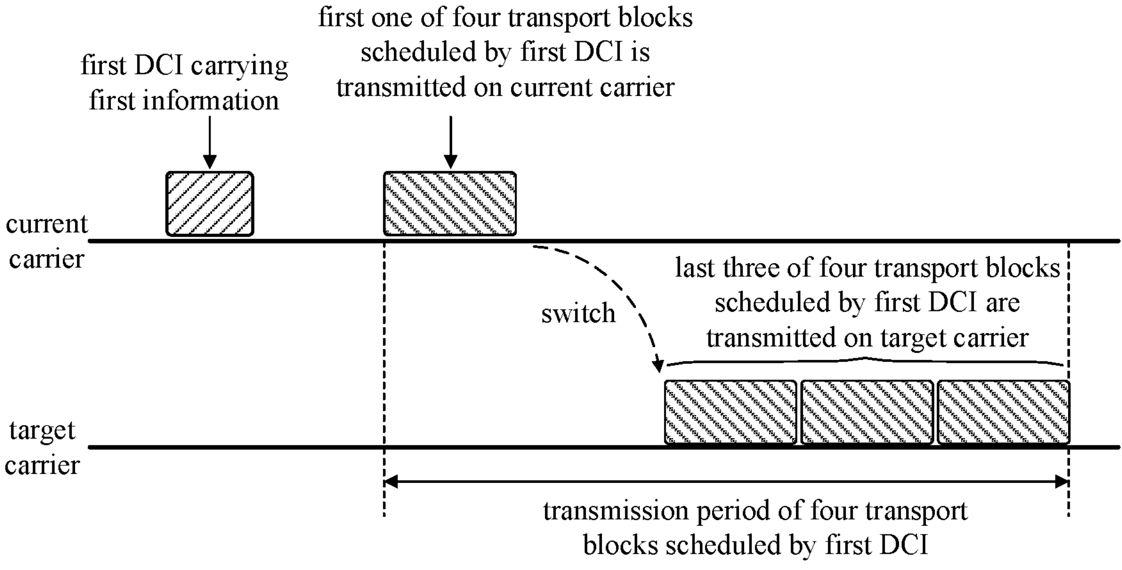
FIG. 7 is a schematic structural diagram of cross-carrier data transmission in a transmission period of four transport blocks scheduled by a first DCI provided in implementations of the disclosure.
FIG. 8 is a schematic architectural diagram of non-terrestrial network communication provided in implementations of the disclosure.

For example, in FIG. 8, the satellite 810 sequentially generates 10 beams on the ground along a fixed trajectory and each of the 10 beams corresponds to one carrier, i.e., 10 carriers. In this case, the current location of the terminal 820 is in an area corresponding to carrier index C3, so that the satellite 810 and the terminal 820 communicate with each other through carrier index C3 (i.e., the index of the current carrier). The network device then determines the carrier index set {C3, C4, C5, C6, C7, C8, C9} and the candidate carrier index set associated with each carrier index in the carrier index set (i.e., the carrier index set information) according to the current location information of the terminal 820 and the preset satellite ephemeris. Since the adjacent carrier indexes of the beam corresponding to carrier index C3 are carrier index C0, carrier index C1, carrier index C2, carrier index C4, carrier index C5, and carrier index C6, and the satellite 810 will move along the "satellite motion direction" shown in the figure, the candidate carrier index set associated with carrier index C3 is {C4, C5, C6}. Similarly, the candidate carrier index set associated with carrier index C4 is {C5, C9}, the candidate carrier index set associated with carrier index C5 is {C7, C8, C9}, and so on. Finally, the network device sends the carrier index set and the candidate carrier index set associated with each carrier index in the carrier index set to the terminal through RRC dedicated signaling.

The first indication information will be described in detail below in the implementations of the disclosure.

Specifically, the first indication information may be Z-bit information, and Z is an integer greater than 1. The Z-bit information may have an index for indicating the target carrier through bit coding mode.

Further, Z can be configured by the network device through the RRC dedicated signaling.

It should be noted that, when the length of the first indication information is Z bits, the first indication information may be referred to as Z-bit information, and the bit coding mode of Z bits includes any coding combination of the Z bits. For example, when Z is 2, the bit coding mode of the 2 bits includes "00", "01", "10", and "11". For this purpose, the terminal can indicate the index of the target carrier by the bit coding mode in the Z-bit information.

Further, Z satisfies at least one of the following manners: Z is determined by the number of carrier indexes in the candidate carrier index set associated with the index of the current carrier, and Z has a mapping relationship with R.

It can be understood that, the network device can configure Z by the number of the carrier indexes in the candidate carrier index set in the carrier index set information, such that the network can configure the Z-bit information to indicate the index of the target carrier, avoiding excessive signaling overhead. Meanwhile, there may be reserved bits in Z-bit information. For example, if the number of the carrier indexes in the candidate carrier index set associated with the index of the current carrier is 3, Z can be 2. If the number of the carrier indexes in the candidate carrier index set associated with the index of the current carrier is 5, Z can be 3. In this case, there may be reserved bits in the 3-bit information. An example will be described below in conjunction with the first indication information and FIG. 8.

For example, firstly, the network device sends the carrier index set {C3, C4, C5, C6, C7, C8, C9} and the candidate carrier index set associated with each carrier index in the carrier index set to the terminal through RRC dedicated signaling. The candidate carrier index set associated with carrier index C3 is {C4, C5, C6}.

Then, the network device configures 2-bit information (i.e., first indication information) to the terminal in the first DCI through the RRC dedicated signaling. Carrier index C3 is used for transmitting the first DCI (i.e., the current carrier is the carrier corresponding to carrier index C3). If the bit coding mode in the 2-bit information is "00", the 2-bit information is indicative of a first carrier index (i.e., C4) in the candidate carrier index set {C4, C5, C6} associated with carrier index C3. If the bit coding mode in the 2-bit information is "01", the 2-bit information is indicative of a second carrier index (i.e., C5) in the candidate carrier index set {C4, C5, C6} associated with carrier index C3. If the bit coding mode in the 2-bit information is "10", the 2-bit information is indicative of a third carrier index (i.e., C6) in the candidate carrier index set {C4, C5, C6} associated with carrier index C3. If the bit coding mode of 2-bit information is "11", the 2-bit information is used as a reserved bit.

Finally, when the 2-bit information is indicative of the first carrier index in the candidate carrier index set {C4, C5, C6}, the index of the target carrier is carrier index C4. In this case, the current carrier is the carrier corresponding to carrier index C3, and the target carrier is the index corresponding to carrier index C4.

As can be seen, the index of the target carrier is indicated by the first indication information in the first DCI, so that the target carrier is determined by the index of the target carrier, and the cross-carrier data transmission in the transmission process of the data scheduled by the first DCI is realized.

S530, the terminal determines, according to the first information, whether to switch the data scheduled by the first DCI from the current carrier to the target carrier for transmission.

The current carrier is the carrier for transmitting the first DCI.

As can be seen, in the implementations of the disclosure, the network device in the non-terrestrial network communication system sends the first DCI to the terminal in the non-terrestrial network communication system. Then, the terminal obtains the first DCI, and determines whether to switch the data scheduled by the first DCI from the current carrier to the target carrier for transmission, according to the first information carried by the first DCI. As such, cross-carrier data transmission in the transmission process of the data scheduled by the first DCI is achieved through the first information, which is not only beneficial to alleviating the restriction on network data scheduling due to frequent carrier switching (i.e., beam switching) in the non-terrestrial network communication system, but also beneficial to improving the throughput of the non-terrestrial network communication system.

In the above, solutions of implementations of the disclosure are mainly introduced from the perspective of interaction among various network elements in the method. It can be understood that, to realize the above functions, the terminal or the network device includes a corresponding hardware structure and/or software module for performing each function. Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be considered beyond the scope of the disclosure.

In implementations of the disclosure, functional units of the terminal or the network device can be divided according to the above method examples. For example, each function may correspond to each function unit, or two or more functions may be integrated into one processing unit. The integrated unit can be realized either in the form of hardware or in the form of software program module. It should be noted that, the division of the units in implementations of the disclosure is schematic and is merely a logical function division, and there can be another division manner in actual implementation.

Figure 9:
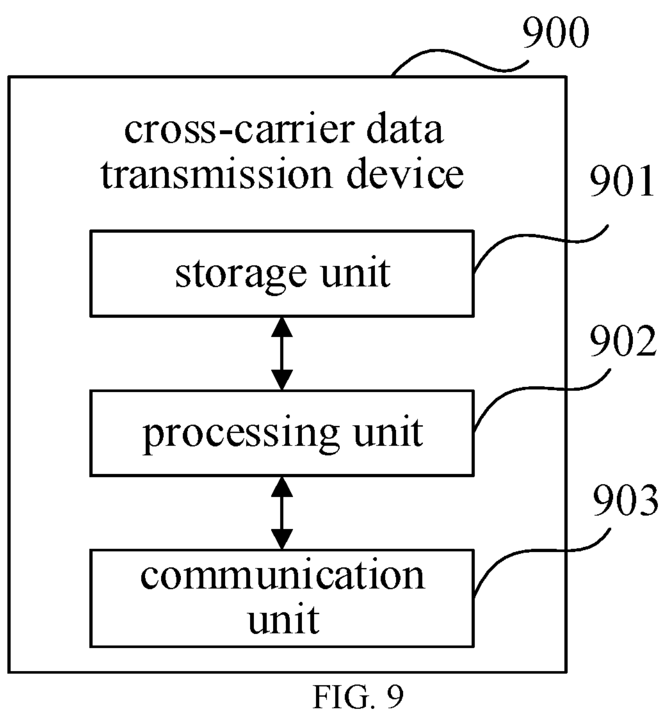
FIG. 9 is a block diagram of functional units of a cross-carrier data transmission device provided in implementations of the disclosure.

In the case of integrated units, FIG. 9 is a block diagram of functional units of a cross-carrier data transmission device provided in implementations of the disclosure. The cross-carrier data transmission device 900 is applied to a terminal in a non-terrestrial network communication system and includes a processing unit 902 and a communication unit 903. The processing unit 902 is used to control and manage operations of the terminal. For example, the processing unit 902 is used to support the terminal to perform some operations in FIG. 5 and other processes of the technical solutions described herein. The communication unit 903 is used to support communication between the terminal and other devices in the non-terrestrial network communication system. The cross-carrier data transmission device 900 may also include a storage unit 901 for storing program codes and data of the terminal.

The processing unit 902 may be a processor or a controller, such as a central processing unit (CPU), a general purpose processor, a digital signal processor (DSP), an application-specific integrated circuit (ASIC), a field programmable gate array (FPGA), or other programmable logic devices, transistor logic devices, hardware components, or any combination thereof. It can implement or execute various exemplary logic blocks, modules, and circuits described in conjunction with the disclosure. The processing unit 902 may also be a combination that implements computing functions, for example, a combination of one or more microprocessors, a combination of DSP and microprocessors, and the like. The communication unit 903 may be a communication interface, a transceiver, a transceiver circuit, and the like, and the storage unit 901 may be a memory. When the processing unit 902 is a processor, the communication unit 903 is a communication interface, and the storage unit 901 is a memory, the cross-carrier data transmission device 900 of implementations of the disclosure may be a terminal illustrated in FIG. 11.

In specific implementation, the processing unit 902 is used to perform any operation performed by the terminal in the above method implementations, and when data transmission such as sending is performed, the communication unit 903 can be selectively invoked to complete the corresponding operation. Details are given below.

The processing unit 902 is configured to: obtain first DCI from the network device, where the first DCI carries first information; and determine, according to the first information, whether data scheduled by the first DCI is to be switched from a current carrier to a target carrier for transmission, where the current carrier is a carrier for transmitting the first DCI.

Figure 5:
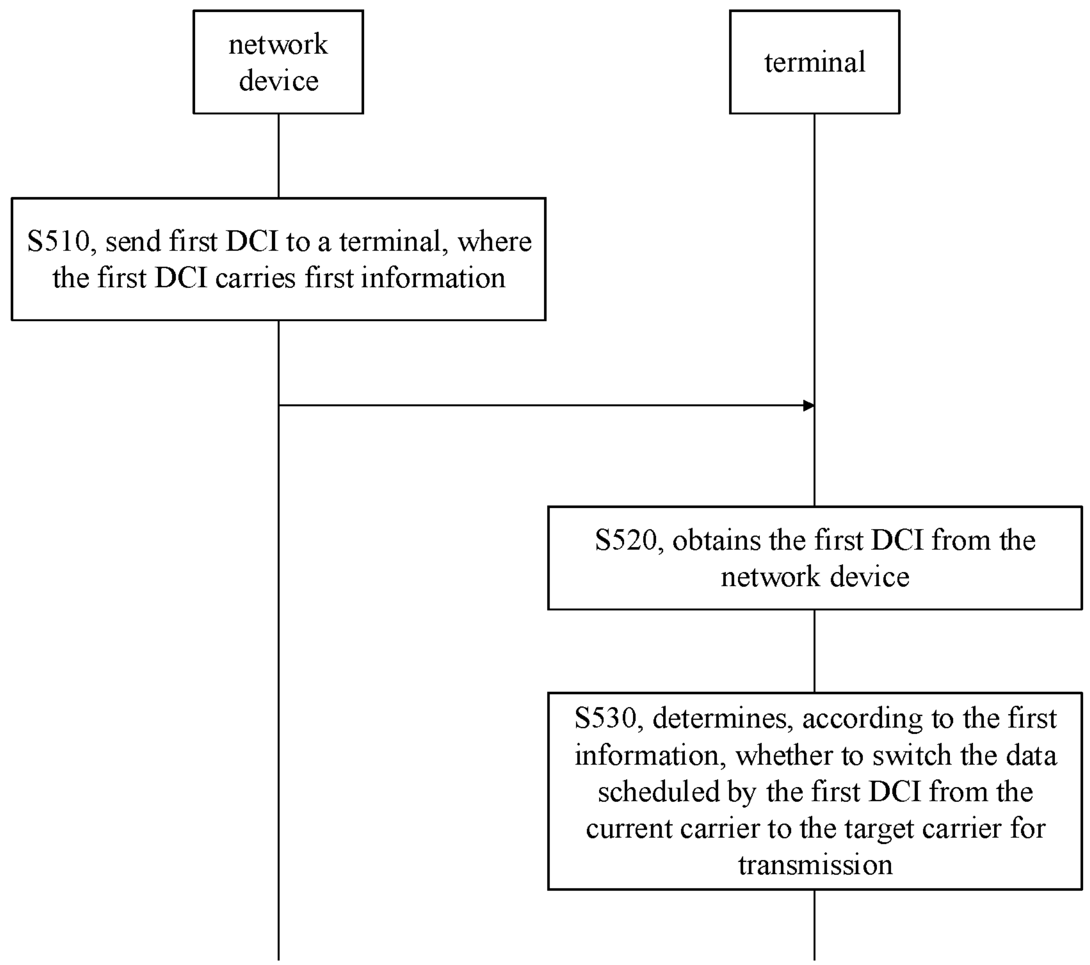
FIG. 5 is a schematic flow chart of a cross-carrier data transmission method provided in implementations of the disclosure.

It should be noted that the specific implementation of each operation in the implementation described in FIG. 9 can be referred to the above description of the method implementation shown in FIG. 5, which will not be described in detail herein.

As can be seen, in the implementation of the disclosure, the first DCI carrying the first information is obtained from the network device, and whether the data scheduled by the first DCI is to be switched from the current carrier to the target carrier for transmission is determined according to the first information carried by the first DCI. As such, the cross-carrier data transmission in the transmission process of the data scheduled by the first DCI is realized through the first information, which is not only beneficial to alleviating the restriction on the network data scheduling caused by frequent carrier switching (i.e. beam switching) in the non-terrestrial network communication system, but also beneficial to improving the throughput of the non-terrestrial network communication system.

In a possible example, the current carrier and the target carrier correspond to different beams.

In a possible example, the first information includes first indication information and the first indication information is indicative of an index of the target carrier.

In a possible example, the first information further includes second indication information and third indication information, where the second indication information is indicative of a total number M of transmission repetitions of the data scheduled by the first DCI, where M is an integer greater than 1; and the third indication information is indicative of a first value index of a ratio of the number of transmissions on the current carrier to the total number of transmission repetitions, where the first value index is used for determining a first value in ratio-coefficient value set information.

In a possible example, the third indication information has a length of X bits and X is determined by the number of values in the ratio-coefficient value set information.

In a possible example, the ratio-coefficient value set information is indicated by the network device through system broadcast information or RRC dedicated signaling, or the ratio-coefficient value set information is pre-configured.

In a possible example, the processing unit 902 configured to determine, according to the first information, whether the data scheduled by the first DCI is to be switched from the current carrier to the target carrier for transmission is configured to: determine that first N times of transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, where N is determined by the first value and M.

In a possible example, the first information further includes fourth indication information and fifth indication information, where the fourth indication information is indicative of a total number S of transport blocks contained in the data scheduled by the first DCI, where S is an integer greater than 1; and the fifth indication information is indicative of a second value index of the number of transport blocks transmitted by the current carrier in the total number of transport blocks, where the second value index is used for determining a second value in transport-block number value set information.

In a possible example, the fifth indication information has a length of Y bits and Y is determined by the number of values in the transport-block number value set information.

In a possible example, the transport-block number value set information is indicated by the network device through system broadcast information or RRC dedicated signaling, or the transport-block number value set information is pre-configured.

In a possible example, the processing unit 902 configured to determine, according to the first information, whether the data scheduled by the first DCI is to be switched from the current carrier to the target carrier for transmission is configured to: determine that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, where T is determined by the second value and S.

In a possible example, the index of the target carrier is in a carrier index set information. The carrier index set information includes indexes of Q carriers and one candidate carrier index set associated with each of the indexes of the Q carriers, the indexes of the Q carriers include an index of the current carrier, and an index of the target carrier is specifically in a candidate carrier index set associated with the index of the current carrier. The index of each carrier in the carrier index set information corresponds to one beam, where Q is an integer greater than 1. The candidate carrier index set includes indexes of R carriers in the indexes of the Q carriers, and R is less than or equal to Q.

In a possible example, the carrier index set information is configured by the network device through the RRC dedicated signaling. Alternatively, the carrier index set information is pre-configured. In a possible example, the carrier index set information satisfies at least one of the following manners: the indexes of the Q carriers in the carrier index set information are determined by a current location information of the terminal and a preset satellite ephemeris, and the indexes of the R carriers in the candidate carrier index set in the carrier index set information are determined by distribution of beams corresponding to the indexes of the Q carriers.

In a possible example, the first indication information is Z-bit information, and Z is an integer greater than 1. The Z-bit information has an index for indicating the target carrier through bit coding mode.

In a possible example, Z is configured by the network device through the RRC dedicated signaling.

In a possible example, Z satisfies at least one of the following manners: Z is determined by the number of carrier indexes in the candidate carrier index set associated with the index of the current carrier, and Z has a mapping relationship with R.

Figure 10:
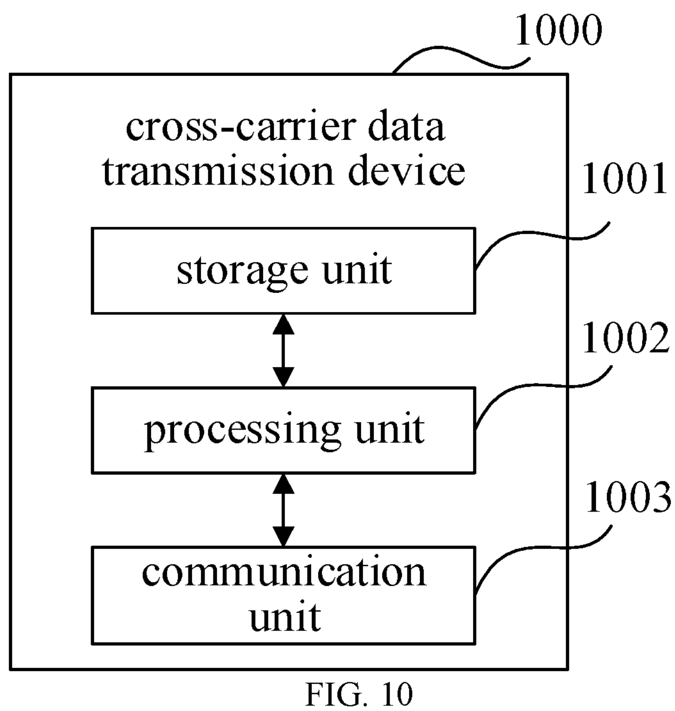
FIG. 10 is another block diagram of functional units of a cross-carrier data transmission device provided in implementations of the disclosure.

In the case of integrated units, FIG. 10 is another block diagram of functional units of a cross-carrier data transmission device provided in implementations of the disclosure. The cross-carrier data transmission device 1000 is applied to a network device in a non-terrestrial network communication system and includes a processing unit 1002 and a communication unit 1003. The processing unit 1002 is used to control and manage operations of the network device. For example, the processing unit 1002 is used to support the network device to perform some operations in FIG. 5 and other processes of the technical solutions described herein. The communication unit 1003 is used to support communication between the network device and other devices in the non-terrestrial network communication system. The cross-carrier data transmission device 1000 may also include a storage unit 1001 for storing program codes and data of the network device.

The processing unit 1002 may be a processor or a controller, such as a CPU, DSP, an ASIC, a FPGA, or other programmable logic devices, transistor logic devices, hardware components, or any combination thereof. It can implement or execute various exemplary logic blocks, modules, and circuits described in conjunction with the disclosure. The processing unit 1002 may also be a combination that implements computing functions, for example, a combination of one or more microprocessors, a combination of DSP and microprocessors, and the like. The communication unit 1003 may be a communication interface, a transceiver, a transceiver circuit, and the like, and the storage unit 1001 may be a memory. When the processing unit 1002 is a processor, the communication unit 1003 is a communication interface, and the storage unit 1001 is a memory, the cross-carrier data transmission device 1000 of implementations of the disclosure may be a network device illustrated in FIG. 12.

In specific implementation, the processing unit 1002 is used to perform any operation performed by the network device in the above method implementations, and when data transmission such as sending is performed, the communication unit 1003 can be selectively invoked to complete the corresponding operation. Details are given below.

The processing unit 1002 is configured to: send first DCI to the terminal, where the first DCI carries first information, the first information is used for determining whether data scheduled by the first DCI is to be switched from a current carrier to a target carrier for transmission, and the current carrier is a carrier for transmitting the first DCI.

It should be noted that the specific implementation of each operation in the implementation described in FIG. 10 can be referred to the above description of the method implementation shown in FIG. 5, which will not be described in detail herein.

As can be seen, in the implementation of the disclosure, the first DCI carrying the first information is sent to the terminal in the non-terrestrial network communication system. The first information is configured to determine whether the data scheduled by the first DCI is to be switched from the current carrier to the target carrier for transmission. As such, the cross-carrier data transmission in the transmission process of the data scheduled by the first DCI is realized through the first information, which is not only beneficial to alleviating the restriction on the network data scheduling caused by frequent carrier switching (i.e. beam switching) in the non-terrestrial network communication system, but also beneficial to improving the throughput of the non-terrestrial network communication system.

In a possible example, the current carrier and the target carrier correspond to different beams.

In a possible example, the first information includes first indication information and the first indication information is indicative of an index of the target carrier.

In a possible example, the first information further includes second indication information and third indication information, where the second indication information is indicative of a total number M of transmission repetitions of the data scheduled by the first DCI, where M is an integer greater than 1; and the third indication information is indicative of a first value index of a ratio of the number of transmissions on the current carrier to the total number of transmission repetitions, where the first value index is used for determining a first value in ratio-coefficient value set information.

In a possible example, the third indication information has a length of X bits and X is determined by the number of values in the ratio-coefficient value set information.

In a possible example, the ratio-coefficient value set information is indicated by the network device through system broadcast information or RRC dedicated signaling, or the ratio-coefficient value set information is pre-configured.

In a possible example, the processing unit 1002 configured to determine, according to the first information, whether the data scheduled by the first DCI is to be switched from the current carrier to the target carrier for transmission is configured to: determine that first N times of transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, where N is determined by the first value and M.

In a possible example, the first information further includes fourth indication information and fifth indication information, where the fourth indication information is indicative of a total number S of transport blocks contained in the data scheduled by the first DCI, where S is an integer greater than 1; and the fifth indication information is indicative of a second value index of the number of transport blocks transmitted by the current carrier in the total number of transport blocks, where the second value index is used for determining a second value in transport-block number value set information.

In a possible example, the fifth indication information has a length of Y bits and Y is determined by the number of values in the transport-block number value set information.

In a possible example, the transport-block number value set information is indicated by the network device through system broadcast information or RRC dedicated signaling, or the transport-block number value set information is pre-configured.

In a possible example, the processing unit 1002 configured to determine, according to the first information, whether the data scheduled by the first DCI is to be switched from the current carrier to the target carrier for transmission is configured to: determine that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, where T is determined by the second value and S.

In a possible example, the index of the target carrier is in a carrier index set information. The carrier index set information includes indexes of Q carriers and one candidate carrier index set associated with each of the indexes of the Q carriers, the indexes of the Q carriers include an index of the current carrier, and an index of the target carrier is specifically in a candidate carrier index set associated with the index of the current carrier. The index of each carrier in the carrier index set information corresponds to one beam, where Q is an integer greater than 1. The candidate carrier index set includes indexes of R carriers in the indexes of the Q carriers, and R is less than or equal to Q.

In a possible example, the carrier index set information is configured by the network device through the RRC dedicated signaling. Alternatively, the carrier index set information is pre-configured. In a possible example, the carrier index set information satisfies at least one of the following manners: the indexes of the Q carriers in the carrier index set information are determined by a current location information of the network device and a preset satellite ephemeris, and the indexes of the R carriers in the candidate carrier index set in the carrier index set information are determined by distribution of beams corresponding to the indexes of the Q carriers.

In a possible example, the first indication information is Z-bit information, and Z is an integer greater than 1. The Z-bit information has an index for indicating the target carrier through bit coding mode.

In a possible example, Z is configured by the network device through the RRC dedicated signaling.

In a possible example, Z satisfies at least one of the following manners: Z is determined by the number of carrier indexes in the candidate carrier index set associated with the index of the current carrier, and Z has a mapping relationship with R.

Figure 11:
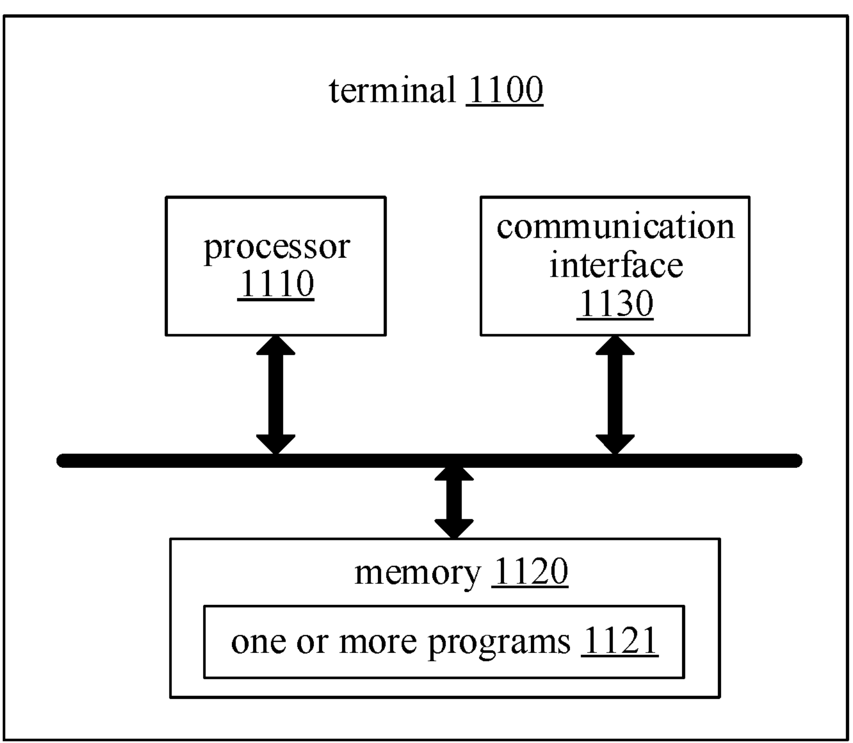
FIG. 11 is a schematic structural diagram of a terminal provided in implementations of the disclosure.

Referring to FIG. 11, FIG. 11 is a structural diagram of a terminal provided in implementations of the disclosure. The terminal 1100 includes a processor 1110, a memory 1120, a communication interface 1130, and at least one communication bus for connecting the processor 1110, the memory 1120, and the communication interface 1130.

The memory 1120 includes, but is not limited to, a random access memory (RAM), a read-only memory (ROM), an erasable programmable read-only memory (EPROM), or a portable read-only memory (CDROM). The memory 1120 is for associated instructions and data.

The communication interface 1130 is used to receive and send data.

The processor 1110 may be one or more CPUs. In the case where the processor 1110 is one CPU the CPU may be a single-core CPU or a multi-core CPU.

The processor 1110 in the terminal 1100 is configured to read one or more programs 1121 stored in the memory 1120 to perform the following steps: obtaining first DCI from the network device, where the first DCI carries first information; and determining, according to the first information, whether data scheduled by the first DCI is to be switched from a current carrier to a target carrier for transmission, where the current carrier is a carrier for transmitting the first DCI.

It should be noted that the specific implementation of each operation in the implementation described in FIG. 11 can be referred to the above description of the method implementation shown in FIG. 5, which will not be described in detail herein.

As can be seen, in the implementation of the disclosure, the first DCI carrying the first information is obtained from the network device, and whether the data scheduled by the first DCI is to be switched from the current carrier to the target carrier for transmission is determined according to the first information carried by the first DCI. As such, the cross-carrier data transmission in the transmission process of the data scheduled by the first DCI is realized through the first information, which is not only beneficial to alleviating the restriction on the network data scheduling caused by frequent carrier switching (i.e. beam switching) in the non-terrestrial network communication system, but also beneficial to improving the throughput of the non-terrestrial network communication system.

In a possible example, the current carrier and the target carrier correspond to different beams.

In a possible example, the first information includes first indication information and the first indication information is indicative of an index of the target carrier.

In a possible example, the first information further includes second indication information and third indication information, where the second indication information is indicative of a total number M of transmission repetitions of the data scheduled by the first DCI, where M is an integer greater than 1; and the third indication information is indicative of a first value index of a ratio of the number of transmissions on the current carrier to the total number of transmission repetitions, where the first value index is used for determining a first value in ratio-coefficient value set information.

In a possible example, the third indication information has a length of X bits and X is determined by the number of values in the ratio-coefficient value set information.

In a possible example, the ratio-coefficient value set information is indicated by the network device through system broadcast information or RRC dedicated signaling, or the ratio-coefficient value set information is pre-configured.

In a possible example, the processor 1110 configured to determine, according to the first information, whether the data scheduled by the first DCI is to be switched from the current carrier to the target carrier for transmission is configured to: determine that first N times of transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, where N is determined by the first value and M.

In a possible example, the first information further includes fourth indication information and fifth indication information, where the fourth indication information is indicative of a total number S of transport blocks contained in the data scheduled by the first DCI, where S is an integer greater than 1; and the fifth indication information is indicative of a second value index of the number of transport blocks transmitted by the current carrier in the total number of transport blocks, where the second value index is used for determining a second value in transport-block number value set information.

In a possible example, the fifth indication information has a length of Y bits and Y is determined by the number of values in the transport-block number value set information.

In a possible example, the transport-block number value set information is indicated by the network device through system broadcast information or RRC dedicated signaling, or the transport-block number value set information is pre-configured.

In a possible example, the processor 1110 configured to determine, according to the first information, whether the data scheduled by the first DCI is to be switched from the current carrier to the target carrier for transmission is configured to: determine that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, where T is determined by the second value and S.

In a possible example, the index of the target carrier is in a carrier index set information. The carrier index set information includes indexes of Q carriers and one candidate carrier index set associated with each of the indexes of the Q carriers, the indexes of the Q carriers include an index of the current carrier, and an index of the target carrier is specifically in a candidate carrier index set associated with the index of the current carrier. The index of each carrier in the carrier index set information corresponds to one beam, where Q is an integer greater than 1. The candidate carrier index set includes indexes of R carriers in the indexes of the Q carriers, and R is less than or equal to Q.

In a possible example, the carrier index set information is configured by the network device through the RRC dedicated signaling. Alternatively, the carrier index set information is pre-configured. In a possible example, the carrier index set information satisfies at least one of the following manners: the indexes of the Q carriers in the carrier index set information are determined by a current location information of the terminal and a preset satellite ephemeris, and the indexes of the R carriers in the candidate carrier index set in the carrier index set information are determined by distribution of beams corresponding to the indexes of the Q carriers.

In a possible example, the first indication information is Z-bit information, and Z is an integer greater than 1. The Z-bit information has an index for indicating the target carrier through bit coding mode.

In a possible example, Z is configured by the network device through the RRC dedicated signaling.

In a possible example, Z satisfies at least one of the following manners: Z is determined by the number of carrier indexes in the candidate carrier index set associated with the index of the current carrier, and Z has a mapping relationship with R.

Figure 12:
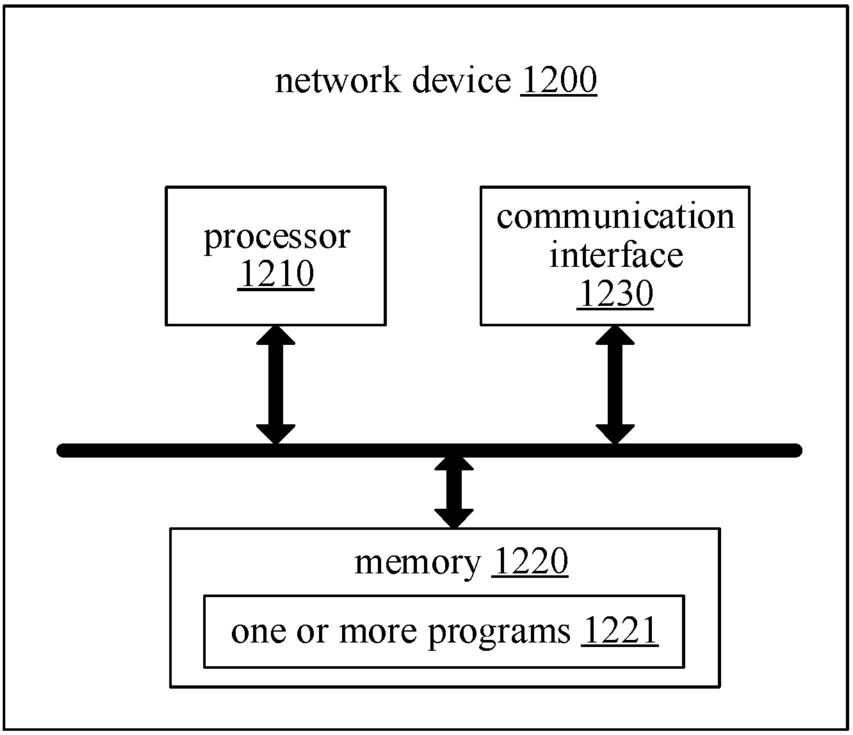
FIG. 12 is a schematic structural diagram of a network device provided in implementations of the disclosure.

Referring to FIG. 12, FIG. 12 is a schematic structural diagram of a network device provided in implementations of the disclosure. The network device 1200 includes a processor 1210, a memory 1220, a communication interface 1230, and at least one communication bus for connecting the processor 1210, the memory 1220, and the communication interface 1230.

The memory 1220 includes but is not limited to RAM, ROM, EPROM, or CD-ROM. The memory 1220 is for storing related instructions and data.

The communication interface 1230 is used to receive and send data.

The processor 1210 may be one or more CPUs. In the case where the processor 1210 is one CPU, the CPU may be a single-core CPU or a multi-core CPU.

The processor 1210 in the network device 1200 is operable to read one or more programs 1221 stored in a memory 1220 to perform the steps: sending first DCI to the terminal, where the first DCI carries first information, the first information is used for determining whether data scheduled by the first DCI is to be switched from a current carrier to a target carrier for transmission, and the current carrier is a carrier for transmitting the first DCI.

It should be noted that the specific implementation of each operation in the implementation described in FIG. 12 can be referred to the above description of the method implementation shown in FIG. 5, which will not be described in detail herein.

As can be seen, in the implementation of the disclosure, the first DCI carrying the first information is sent to the terminal. The first information is configured to determine whether the data scheduled by the first DCI is to be switched from the current carrier to the target carrier for transmission. As such, the cross-carrier data transmission in the transmission process of the data scheduled by the first DCI is realized through the first information, which is not only beneficial to alleviating the restriction on the network data scheduling caused by frequent carrier switching (i.e. beam switching) in the non-terrestrial network communication system, but also beneficial to improving the throughput of the non-terrestrial network communication system.

In a possible example, the current carrier and the target carrier correspond to different beams.

In a possible example, the first information includes first indication information and the first indication information is indicative of an index of the target carrier.

In a possible example, the first information further includes second indication information and third indication information, where the second indication information is indicative of a total number M of transmission repetitions of the data scheduled by the first DCI, where M is an integer greater than 1; and the third indication information is indicative of a first value index of a ratio of the number of transmissions on the current carrier to the total number of transmission repetitions, where the first value index is used for determining a first value in ratio-coefficient value set information.

In a possible example, the third indication information has a length of X bits and X is determined by the number of values in the ratio-coefficient value set information.

In a possible example, the ratio-coefficient value set information is indicated by the network device through system broadcast information or RRC dedicated signaling, or the ratio-coefficient value set information is pre-configured.

In a possible example, the processor 1210 configured to determine, according to the first information, whether the data scheduled by the first DCI is to be switched from the current carrier to the target carrier for transmission is configured to: determine that first N times of transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, where N is determined by the first value and M.

In a possible example, the first information further includes fourth indication information and fifth indication information, where the fourth indication information is indicative of a total number S of transport blocks contained in the data scheduled by the first DCI, where S is an integer greater than 1; and the fifth indication information is indicative of a second value index of the number of transport blocks transmitted by the current carrier in the total number of transport blocks, where the second value index is used for determining a second value in transport-block number value set information.

In a possible example, the fifth indication information has a length of Y bits and Y is determined by the number of values in the transport-block number value set information.

In a possible example, the transport-block number value set information is indicated by the network device through system broadcast information or RRC dedicated signaling, or the transport-block number value set information is pre-configured.

In a possible example, the processor 1210 configured to determine, according to the first information, whether the data scheduled by the first DCI is to be switched from the current carrier to the target carrier for transmission is configured to: determine that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, where T is determined by the second value and S.

In a possible example, the index of the target carrier is in a carrier index set information. The carrier index set information includes indexes of Q carriers and one candidate carrier index set associated with each of the indexes of the Q carriers, the indexes of the Q carriers include an index of the current carrier, and an index of the target carrier is specifically in a candidate carrier index set associated with the index of the current carrier. The index of each carrier in the carrier index set information corresponds to one beam, where Q is an integer greater than 1. The candidate carrier index set includes indexes of R carriers in the indexes of the Q carriers, and R is less than or equal to Q.

In a possible example, the carrier index set information is configured by the network device through the RRC dedicated signaling. Alternatively, the carrier index set information is pre-configured. In a possible example, the carrier index set information satisfies at least one of the following manners: the indexes of the Q carriers in the carrier index set information are determined by a current location information of the network device and a preset satellite ephemeris, and the indexes of the R carriers in the candidate carrier index set in the carrier index set information are determined by distribution of beams corresponding to the indexes of the Q carriers.

In a possible example, the first indication information is Z-bit information, and Z is an integer greater than 1. The Z-bit information has an index for indicating the target carrier through bit coding mode.

In a possible example, Z is configured by the network device through the RRC dedicated signaling.

In a possible example, Z satisfies at least one of the following manners: Z is determined by the number of carrier indexes in the candidate carrier index set associated with the index of the current carrier, and Z has a mapping relationship with R.

Implementations of the disclosure provide a cross-carrier data transmission method, a terminal, and a storage medium, to achieve cross-carrier data transmission in a transmission process of data scheduled by first DCI through first information carried by the first DCI. It is beneficial to alleviating restriction on network data scheduling due to frequent carrier switching in a non-terrestrial network communication system, and also beneficial to improving throughput of the non-terrestrial network communication system.

Implementations of the disclosure provide a cross-carrier data transmission method. The cross-carrier data transmission method is applied to a terminal in a non-terrestrial network communication system. The non-terrestrial network communication system includes the terminal and a network device. The method includes: obtaining first DCI from the network device, where the first DCI carries first information; and determining, according to the first information, whether data scheduled by the first DCI is to be switched from a current carrier to a target carrier for transmission, where the current carrier is a carrier for transmitting the first DCI.

Implementations of the disclosure provide a cross-carrier data transmission method. The cross-carrier data transmission method is applied to a network device in a non-terrestrial network communication system. The non-terrestrial network communication system includes the network device and a terminal. The method includes: sending first DCI to the terminal, where the first DCI carries first information, the first information is used for determining whether data scheduled by the first DCI is to be switched from a current carrier to a target carrier for transmission, and the current carrier is a carrier for transmitting the first DCI.

Implementations of the disclosure provide a cross-carrier data transmission apparatus. The cross-carrier data transmission apparatus is applied to a terminal in a non-terrestrial network communication system. The non-terrestrial network communication system includes the terminal and a network device. The apparatus includes a processing unit and a communication unit and the processing unit is configured to: obtain, through the communication unit, first DCI from the network device, where the first DCI carries first information; and determine, according to the first information, whether data scheduled by the first DCI is to be switched from a current carrier to a target carrier for transmission, where the current carrier is a carrier for transmitting the first DCI.

Implementations of the disclosure provide a cross-carrier data transmission apparatus. The cross-carrier data transmission apparatus is applied to a network device in a non-terrestrial network communication system. The non-terrestrial network communication system includes the network device and a terminal. The apparatus includes a processing unit and a communication unit and the processing unit is configured to: send, through the communication unit, first DCI to the terminal, where the first DCI carries first information, the first information is used for determining whether data scheduled by the first DCI is to be switched from a current carrier to a target carrier for transmission, and the current carrier is a carrier for transmitting the first DCI.

Implementations of the disclosure provide a terminal. The terminal is applied to a non-terrestrial network communication system and includes a memory and a processor. The memory is for storing one or more programs. The processor is coupled with the memory and configured to invoke the one or more programs to: perform steps in any method of the terminal of implementations of the disclosure.

Implementations of the disclosure provide a network device. The network device includes a processor, a memory, a communication interface, and one or more programs. The one or more programs are stored in the memory and configured to be executed by the processor. The one or more programs include instructions configured to perform steps in any method of the network device of implementations of the disclosure.

Implementations of the disclosure provide a non-transitory computer-readable storage medium. The computer-readable storage medium is configured to store a computer program. When executed by a terminal in a non-terrestrial network communication system, the computer program causes the terminal to: perform steps in any method of the terminal or the network device of implementations of the disclosure.

Implementations of the disclosure further provide a chip. The chip includes a processor configured to invoke a computer program from a memory and run the computer program, to cause a device installed with the chip to perform some or all of the steps described in the terminal or the network device in the above method implementations.

Implementations of the disclosure further provide a non-transitory computer-readable storage medium. The computer-readable storage medium stores a computer program for electronic data interchange, where the computer program causes a computer to perform some or all of the steps described in the terminal or the network device in the above method implementations.

Implementations of the disclosure further provide a computer program. The computer program is operable to cause a computer to perform some or all of the steps described in the terminal or the network device in the above method implementations. The computer program can be a software installation package.

The operations of the method or algorithm described in implementations of the disclosure may be implemented in the form of hardware or in the form of executing software instructions by the processor. The software instructions may consist of corresponding software modules that may be stored in random access memory (RAM), flash memory, read only memory (ROM), erasable programmable ROM (EPROM), electrically EPROM (EEPROM), register, hard disk, movable hard disk, CD-ROM, or any other form of storage medium well known in the art. An exemplary storage medium is coupled to a processor to enable the processor to read information from and write information to the storage medium. Apparently, the storage medium can also be part of the processor. The processor and the storage medium may be in the ASIC. In addition, the ASIC may be in the terminal or the network device. Apparently, the processor and the storage medium may also exist as discrete components in the terminal or the network device.

Those skilled in the art will appreciate that, in one or more of the above examples, the functions described in implementations of the disclosure may be implemented completely or partly by software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned specific implementations further describe purposes, technical solutions, and advantageous effects of implementations of the disclosure in detail. It should be understood that, the above description is only the specific implementations of the disclosure and is not intended to limit the protection scope of implementations of the disclosure. Any modifications, equivalent substitutions, and improvements made on the basis of the technical solutions of implementations of the disclosure should be included in the protection scope of implementations of the disclosure.

What is claimed is:

1. A cross-carrier data transmission method, applied to a terminal in a non-terrestrial network communication system, the non-terrestrial network communication system comprising the terminal and a network device and the method comprising:

obtaining first downlink control information (DCI) from the network device, wherein the first DCI carries first information, the first information comprises first indication information, and the first indication information is indicative of an index of a target carrier; and determining, according to the first information, whether data scheduled by the first DCI is to be switched from a current carrier to the target carrier for transmission, wherein the current carrier is a carrier for transmitting the first DCI, wherein the first information further comprises second indication information and third indication information; the second indication information is indicative of a total number M of transmission repetitions of the data scheduled by the first DCI, wherein M is an integer greater than 1; and the third indication information is indicative of a first value index of a ratio of the number of transmissions on the current carrier to the total number of transmission repetitions, wherein the first value index is used for determining a first value in ratio-coefficient value set information; or the first information further comprises fourth indication information and fifth indication information; the fourth indication information is indicative of a total number S of transport blocks contained in the data scheduled by the first DCI, wherein S is an integer greater than 1; and the fifth indication information is indicative of a second value index of the number of transport blocks transmitted on the current carrier in the total number of transport blocks, wherein the second value index is used for determining a second value in transport-block number value set information.

2. The method of claim 1, wherein the current carrier and the target carrier correspond to different beams.

3. The method of claim 1, wherein in a case where the first information further comprises the second indication information and the third indication information, the third indication information has a length of X bits and X is determined by the number of values in the ratio-coefficient value set information.

4. The method of claim 1, wherein in a case where the first information further comprises the second indication information and the third indication information, the ratio-coefficient value set information is indicated by the network device through system broadcast information or radio resource control (RRC) dedicated signaling, or the ratio-coefficient value set information is pre-configured.

5. The method of claim 1, wherein in a case where the first information further comprises the second indication information and the third indication information, determining, according to the first information, whether the data scheduled by the first DCI is to be switched from the current carrier to the target carrier for transmission comprises:

determining that first N transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, wherein N is determined by the first value and M.

6. The method of claim 1, wherein in a case where the first information further comprises the fourth indication information and the fifth indication information, the fifth indication information has a length of Y bits and Y is determined by the number of values in the transport-block number value set information.

7. The method of claim 1, wherein in a case where the first information further comprises the fourth indication information and the fifth indication information, the transport-block number value set information is indicated by the network device through system broadcast information or RRC dedicated signaling, or the transport-block number value set information is pre-configured.

8. The method of claim 1, wherein in a case where the first information further comprises the fourth indication information and the fifth indication information, determining, according to the first information, whether the data scheduled by the first DCI is to be switched from the current carrier to the target carrier for transmission comprises:

determining that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, wherein T is determined by the second value and S.

9. A terminal, applied to a non-terrestrial network communication system and comprising:

a memory for storing one or more programs; and a processor coupled with the memory and configured to invoke the one or more programs to:

obtain first downlink control information (DCI) from a network device in the non-terrestrial network communication system, wherein the first DCI carries first information, the first information comprises first indication information, and the first indication information is indicative of an index of a target carrier; and determine, according to the first information, whether data scheduled by the first DCI is to be switched from a current carrier to the target carrier for transmission, wherein the current carrier is a carrier for transmitting the first DCI, wherein the first information further comprises second indication information and third indication information; the second indication information is indicative of a total number M of transmission repetitions of the data scheduled by the first DCI, wherein M is an integer greater than 1; and the third indication information is indicative of a first value index of a ratio of the number of transmissions on the current carrier to the total number of transmission repetitions, wherein the first value index is used for determining a first value in ratio-coefficient value set information; or the first information further comprises fourth indication information and fifth indication information; the fourth indication information is indicative of a total number S of transport blocks contained in the data scheduled by the first DCI, wherein S is an integer greater than 1; and the fifth indication information is indicative of a second value index of the number of transport blocks transmitted on the current carrier in the total number of transport blocks, wherein the second value index is used for determining a second value in transport-block number value set information.

10. The terminal of claim 9, wherein the current carrier and the target carrier correspond to different beams.

11. The terminal of claim 9, wherein in a case where the first information further comprises the second indication information and the third indication information, the third indication information has a length of X bits and X is determined by the number of values in the ratio-coefficient value set information.

12. The terminal of claim 9, wherein in a case where the first information further comprises the second indication information and the third indication information, the ratio-coefficient value set information is indicated by the network device through system broadcast information or radio resource control (RRC) dedicated signaling, or the ratio-coefficient value set information is pre-configured.

13. The terminal of claim 9, wherein in a case where the first information further comprises the second indication information and the third indication information, the processor configured to determine, according to the first information, whether the data scheduled by the first DCI is to be switched from the current carrier to the target carrier for transmission is configured to:

determine that first N transmission repetitions in the total number of transmission repetitions are transmitted on the current carrier and a remaining number of transmission repetitions in the total number of transmission repetitions are transmitted on the target carrier, according to the first value determined by the third indication information and the total number of transmission repetitions indicated by the second indication information, wherein N is determined by the first value and M.

14. The terminal of claim 9, wherein in a case where the first information further comprises the fourth indication information and the fifth indication information, the fifth indication information has a length of Y bits and Y is determined by the number of values in the transport-block number value set information.

15. The terminal of claim 9, wherein in a case where the first information further comprises the fourth indication information and the fifth indication information, the transport-block number value set information is indicated by the network device through system broadcast information or RRC dedicated signaling, or the transport-block number value set information is pre-configured.

16. The terminal of claim 9, wherein in a case where the first information further comprises the fourth indication information and the fifth indication information, determining, according to the first information, whether the data scheduled by the first DCI is to be switched from the current carrier to the target carrier for transmission comprises:

determining that first T transport blocks in the total number of transport blocks are transmitted on the current carrier and at least one remaining transport block in the total number of transport blocks is transmitted on the target carrier, according to the second value determined by the fifth indication information and the total number of transport blocks indicated by the fourth indication information, wherein T is determined by the second value and S.

17. A non-transitory computer-readable storage medium configured to store a computer program, wherein, when executed by a terminal in a non-terrestrial network communication system, the computer program causes the terminal to:

obtain first downlink control information (DCI) from a network device in the non-terrestrial network communication system, wherein the first DCI carries first information, the first information comprises first indication information, and the first indication information is indicative of an index of a target carrier; and determine, according to the first information, whether data scheduled by the first DCI is to be switched from a current carrier to the target carrier for transmission, wherein the current carrier is a carrier for transmitting the first DCI, wherein the first information further comprises second indication information and third indication information; the second indication information is indicative of a total number M of transmission repetitions of the data scheduled by the first DCI, wherein M is an integer greater than 1; and the third indication information is indicative of a first value index of a ratio of the number of transmissions on the current carrier to the total number of transmission repetitions, wherein the first value index is used for determining a first value in ratio-coefficient value set information; or the first information further comprises fourth indication information and fifth indication information; the fourth indication information is indicative of a total number S of transport blocks contained in the data scheduled by the first DCI, wherein S is an integer greater than 1; and the fifth indication information is indicative of a second value index of the number of transport blocks transmitted on the current carrier in the total number of transport blocks, wherein the second value index is used for determining a second value in transport-block number value set information.

* * * * *